US012570770B2

(12) United States Patent
Ramanathan et al.

(10) Patent No.: US 12,570,770 B2
(45) Date of Patent: *Mar. 10, 2026

(54) AQUEOUS METHODS FOR TITANATING A CHROMIUM/SILICA CATALYST WITH AN ALKALI METAL

(71) Applicant: Chevron Phillips Chemical Company LP, The Woodlands, TX (US)

(72) Inventors: Anand Ramanathan, Bartlesville, OK (US); Max P. McDaniel, Bartlesville, OK (US); Jared Barr, Bartlesville, OK (US); Andrew Blagg, Oologah, OK (US); Christopher E. Wittner, Bartlesville, OK (US); Alan L. Solenberger, Bartlesville, OK (US); Zachary T. Kilpatrick, Bartlesville, OK (US); Micheal P. Stevens, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/069,382

(22) Filed: Mar. 4, 2025

(65) Prior Publication Data

US 2025/0243298 A1 Jul. 31, 2025

Related U.S. Application Data

(62) Division of application No. 18/306,326, filed on Apr. 25, 2023, now Pat. No. 12,269,911.

(Continued)

(51) Int. Cl.
B01J 35/40 (2024.01)
C08F 4/02 (2006.01)
C08F 4/78 (2006.01)

(52) U.S. Cl.
CPC .............. *C08F 4/025* (2013.01); *B01J 35/40* (2024.01); *C08F 4/78* (2013.01)

(58) Field of Classification Search
CPC ............ B01J 21/00; B01J 21/06; B01J 21/08; B01J 21/063; B01J 2523/41; B01J 2523/67;

(Continued)

(56) References Cited

U.S. PATENT DOCUMENTS 4,424,320 A * 1/1984 McDaniel ................ B01J 23/26
502/236
6,989,344 B2 1/2006 Cann
(Continued)

FOREIGN PATENT DOCUMENTS

WO 2023212573 A1 11/2023
WO 2025090431 A1 5/2025

OTHER PUBLICATIONS

NPL: The Effect of Alkali Metal Doping on the Performance of Cr/Silica Catalysts in Ethylene Polymerization, Journal of Catalysis 176 pp. 344-351, 1998.*

*Primary Examiner* — Smita S Patel
(74) *Attorney, Agent, or Firm* — Merchant & Gould P.C.

(57) ABSTRACT

Methods for making titanated silica supports, titanated chromium/silica pre-catalysts, and activated titanated chromium/silica catalysts are disclosed in which hydrogen peroxide and an alkali metal precursor are used during catalyst preparation. Resulting titanated chromium/silica pre-catalysts often contain silica, 0.1 to 5 wt. % chromium, 0.1 to 10 wt. % titanium, and less than or equal to 4 wt. % carbon, and further contain an alkali metal or zinc at a molar ratio of alkali metal:titanium or zinc:titanium from 0.02:1 to 3:1 and/or at an amount in a range from 0.01 to 2 mmol of alkali metal or zinc per gram of the silica. High melt index potential activated titanated chromium/silica catalysts can be used to polymerize olefins to produce, for example, ethylene based homopolymers and copolymers having HLMI values of greater than 30 g/10 min.

20 Claims, 1 Drawing Sheet

Related U.S. Application Data

(60) Provisional application No. 63/334,741, filed on Apr. 26, 2022.

(58) Field of Classification Search
 CPC .... B01J 2523/47; B01J 2523/12; B01J 23/24; B01J 23/26; B01J 23/00; B01J 23/16; C08F 4/02; C08F 4/00; C08F 4/025; C08F 4/78
 See application file for complete search history.

(56) References Cited

U.S. PATENT DOCUMENTS

| | | | |
|---|---|---|---|
| 8,633,131 B2 | 1/2014 | Lee | |
| 8,889,078 B2 | 11/2014 | Ji | |
| 9,243,091 B2 | 1/2016 | Moineau | |
| 9,359,270 B2 | 6/2016 | Daly | |
| 9,656,247 B2 | 5/2017 | Daly | |
| 10,130,935 B2 | 11/2018 | Hermans | |
| 10,323,108 B2 | 6/2019 | Yu | |
| 11,154,850 B2 | 10/2021 | Neygandhi | |
| 11,389,786 B2 | 7/2022 | Zou | |
| 11,548,958 B2 | 1/2023 | Mcdaniel | |
| 11,753,358 B2 | 9/2023 | Cruz | |
| 12,030,975 B2 | 7/2024 | Mcdaniel | |
| 12,077,627 B2 * | 9/2024 | Ramanathan | C08F 110/02 |
| 12,269,911 B2 | 4/2025 | Ramanathan | |
| 2020/0392265 A1 * | 12/2020 | Mcdaniel | C08F 4/02 |
| 2021/0384525 A1 | 12/2021 | Kim | |
| 2022/0314203 A1 | 10/2022 | Zou | |
| 2024/0376232 A1 | 11/2024 | Ramanathan | |

* cited by examiner

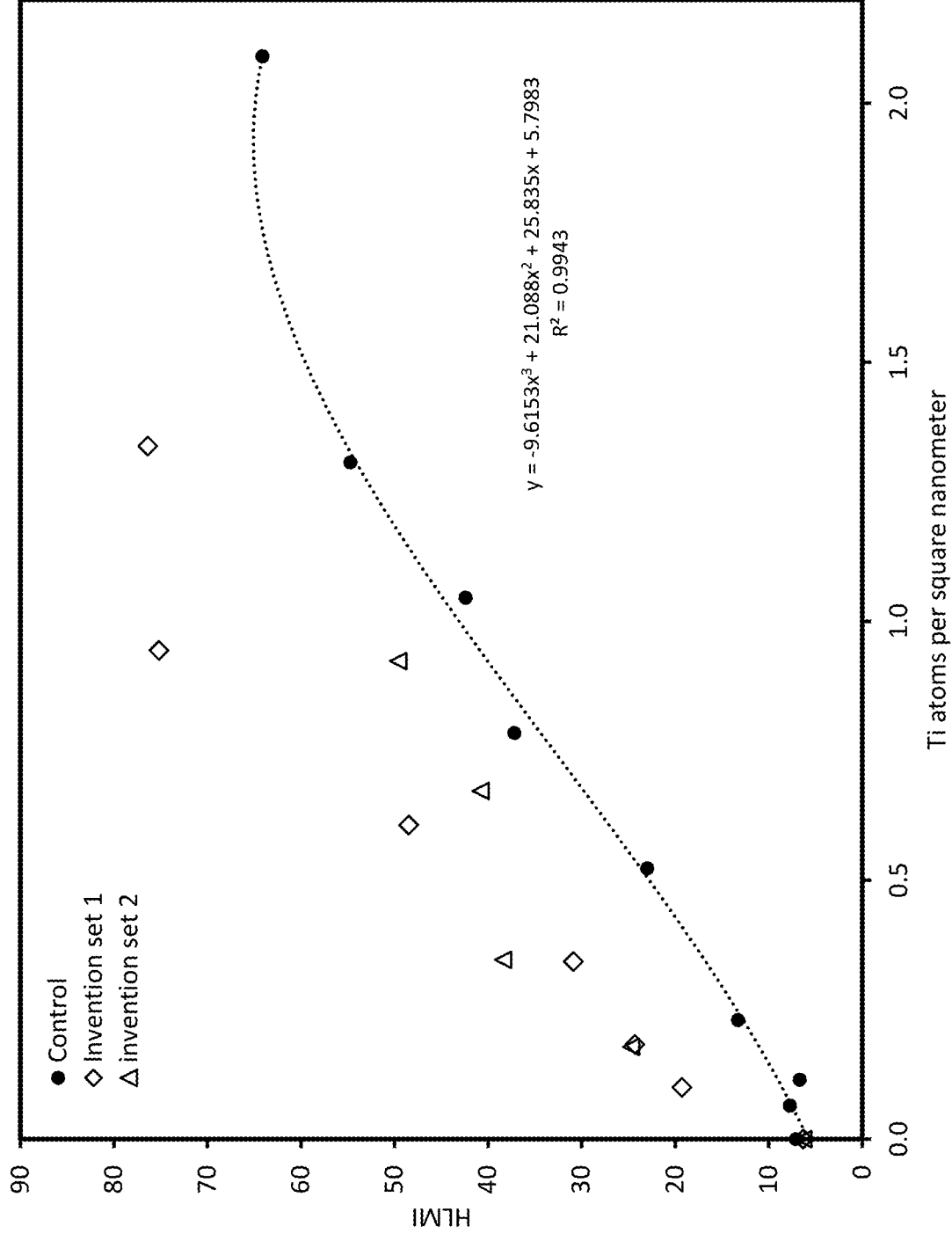

AQUEOUS METHODS FOR TITANATING A CHROMIUM/SILICA CATALYST WITH AN ALKALI METAL

REFERENCE TO RELATED APPLICATIONS

This application is a divisional application of co-pending U.S. patent application Ser. No. 18/306,326, filed on Apr. 25, 2023, now U.S. Pat. No. 12,269,911, which claims the benefit of U.S. Provisional Patent Application No. 63/334,741, filed on Apr. 26, 2022, the disclosures of which are incorporated herein by reference in their entirety.

FIELD OF THE INVENTION

The present disclosure generally relates to titanated chromium catalysts, methods for preparing the titanated chromium catalysts, methods for using the titanated chromium catalysts to polymerize olefins, the polymer resins produced using such chromium catalysts, and articles produced using these polymer resins. More particularly, the present disclosure relates to aqueous methods for making titanated chromium catalysts in which an alkali metal is utilized during catalyst preparation.

BACKGROUND OF THE INVENTION

Chromium/silica catalysts can be used to produce HDPE. The addition of titanium to chromium/silica can increase the activity of the catalyst, but more importantly, can increase the melt index potential of the catalyst, i.e., the ability of the catalyst to produce higher melt index or higher melt flow polymers. Often, titanium addition has been accomplished via an anhydrous route, using a titanium precursor and impregnation onto chromium/silica using a suitable organic solvent, such as a hydrocarbon, an alcohol, or an ether. The presence of organics, unfortunately, can result in high Volatile Organic Compound (VOC) emissions during the preparation, activation, and processing of titanated chromium catalysts. Water-based alternatives are available, but often suffer from poor titanium efficiency and non-uniform incorporation. In view of these drawbacks, it would be beneficial to provide improved methods for making titanated chromium catalysts. Accordingly, it is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect of this invention, a titanated silica support is disclosed, and in this aspect, the titanated silica support can comprise silica, from 0.1 to 10 wt. % titanium, from 0.5 to 12 wt. % water, less than or equal to 2 wt. % carbon, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica.

In another aspect of this invention, a titanated chromium/silica pre-catalyst is disclosed, and in this aspect, the titanated chromium/silica pre-catalyst can comprise silica, from 0.1 to 5 wt. % chromium, from 0.1 to 10 wt. % titanium, from 0.5 to 12 wt. % water, less than or equal to 4 wt. % carbon, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica.

In yet another aspect, a titanated chromium/silica catalyst is disclosed, and in this aspect, the titanated chromium/silica catalyst can comprise silica, from 0.1 to 5 wt. % chromium, from 0.1 to 10 wt. % titanium, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica, wherein at least 60 wt. % of the chromium is present in an oxidation state of +6. In still another aspect, the titanated chromium/silica catalyst can comprise silica, from 0.1 to 5 wt. % chromium, and from 0.1 to 10 wt. % titanium, wherein at least 60 wt. % of the chromium is present in an oxidation state of +6, and the catalyst is characterized by a HLMI (g/10 min) of the polymer that is greater than the equation Y $(HLMI)=(-9.6153x^3+21.088x^2+25.835x+5.7983)$, wherein x is the number of titanium atoms per square nanometer of silica surface area for the titanated chromium/silica catalyst.

The present invention also contemplates and encompasses olefin polymerization processes. Such processes can comprise contacting any of the (activated) titanated chromium/silica catalysts disclosed herein and an optional co-catalyst with an olefin monomer and an optional olefin comonomer in a polymerization reactor system under polymerization conditions to produce an olefin polymer. Beneficially, the titanated chromium/silica catalysts have high melt index potential, allowing the production of olefin polymers having higher melt indices (lower molecular weights), but with less titanium present in the catalyst.

Processes for preparing the titanated silica supports and subsequent chromium catalysts also are described herein. A process for preparing a titanated silica support can include the steps of (i) contacting water, a peroxide compound, and a titanium precursor to form a first mixture, (ii) contacting a silica with the first mixture under conditions sufficient for titanium to adsorb onto the silica and form a second mixture, (iii) isolating a solid fraction from the second mixture, and (iv) drying the solid fraction to form the titanated silica support. Several variations of this process also are provided herein. Titanated chromium/silica pre-catalysts can be prepared by using the same general processes, but impregnating the silica support with a chromium precursor at an appropriate step in the respective process. Subsequently, the (activated) titanated chromium/silica catalyst can be prepared by activating the titanated chromium/silica pre-catalyst under suitable activation conditions.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIG. 1

The following FIGURE forms part of the present specification and is included to further demonstrate certain aspects of the present invention. The invention may be better understood by reference to this FIGURE in combination with the detailed description.

FIG. 1 presents a plot of the HLMI of the polymer versus the number of titanium atoms per square nanometer for the control group of titanated chromium/silica catalysts and for the titanated chromium/silica catalysts of Examples 28-41.

While the inventions disclosed herein are susceptible to various modifications and alternative forms, only a few specific aspects have been shown by way of example in the drawing and described in detail below. The FIGURE and detailed description of specific aspects are not intended to limit the breadth or scope of the inventive concepts or the appended claims in any manner. Rather, the FIGURE and detailed description are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the compounds, compositions, processes, or methods described herein are contemplated with or without explicit description of the particular combination. Additionally, unless explicitly recited otherwise, any aspect or feature disclosed herein can be combined to describe inventive compounds, compositions, processes, or methods consistent with the present disclosure.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The terms "contacting" and "combining" are used herein to describe compositions, processes, and methods in which the materials or components are contacted or combined together in any order, in any manner, and for any length of time, unless otherwise specified. For example, the materials or components can be blended, mixed, slurried, dissolved, reacted, treated, compounded, or otherwise contacted or combined in some other manner or by any suitable method or technique.

In this disclosure, while compositions, processes, and methods are described in terms of "comprising" various components or steps, the compositions, processes, and methods also can "consist essentially of" or "consist of" the various components or steps, unless stated otherwise.

The terms "a," "an," "the," etc., are intended to include plural alternatives, e.g., at least one, unless otherwise specified. For instance, the disclosure of "a reactor" or "a comonomer" is meant to encompass one, or combinations of more than one, reactor or comonomer, respectively, unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer are ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or the titanated chromium catalyst after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the chromium content of the pre-catalyst or catalyst can be in certain ranges in various aspects of this invention. By a disclosure that the pre-catalyst or catalyst contains from 0.1 to 5 wt. % chromium, the intent is to recite that the chromium content can be any amount in the range and, for example, can include any range or combination of ranges from 0.1 to 5 wt. % chromium, such as from 0.3 to 3 wt. %, from 0.4 to 2 wt. %, from 0.5 to 1.5 wt. %, or from 0.7 to 1.5 wt. %, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Disclosed herein are processes for preparing titanated silica supports and titanated chromium/silica pre-catalysts and activated catalysts. Advantageously, a peroxide compound and/or an alkali metal is/are present during the steps used to prepare these supports and catalyst materials, which results in a significant and unexpected increase in the melt index potential of the titanated chromium catalyst. While not wishing to be bound by the following theory, it is believed that the disclosed methods result in more uniform titanium incorporation and more efficient titanium usage, as well as adsorption of the titanium onto the silica support, so less titanium is needed to achieve a desired HLMI of the resultant polymer. Further, it is also believed that the titanium is evenly distributed amongst all particle sizes, instead of a wide distribution of titanium content depending upon the relative sizes—small or large—of the catalyst particles. Titanated Silica Supports and Titanated Chromium Catalysts A representative and non-limiting example of a titanated silica support consistent with this invention can comprise silica, from 0.1 to 10 wt. % titanium, from 0.5 to 12 wt. % water, less than or equal to 2 wt. % carbon, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica. Related to these titanated silica supports are titanated chromium/silica pre-catalysts, an example of which can comprise silica, from 0.1 to 5 wt. % chromium, from 0.1 to 10 wt. % titanium, from 0.5 to 12 wt. % water, less than or equal to 4 wt. % carbon, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica. Herein, a "pre-catalyst" is meant to indicate that the catalyst has not been activated or calcined, which process converts all or a large portion of the lower oxidation state chromium to an oxidation state of +6 (hexavalent chromium). Referring now to this titanated chromium/silica pre-catalyst, at least 75 wt. % of the chromium often is present in an oxidation state of three or less. In some aspects, at least 80 wt. %, or at least 90 wt. %, or at least 95 wt. %, or all or substantially all, of the chromium of the pre-catalyst can be present in an oxidation state of three or less.

Beneficially, there can be substantially no VOC's (volatile organic compounds) emitted during a thermal treatment (e.g., calcination or activation) step. For instance, there can be substantially no VOC's emitted during calcination or activation of the titanated chromium/silica pre-catalyst (or the titanated silica support). Thus, in accordance with certain aspects of this invention, the titanated chromium/silica pre-catalyst (or the titanated silica support) can contain less than or equal to 3 wt. % carbon, less than or equal to 2 wt. % carbon, or less than or equal to 1 wt. % carbon, and in some instances, less than or equal to 0.5 wt. % carbon, less than or equal to 0.3 wt. % carbon, or less than or equal to 0.1 wt. % carbon. These weight percentages are based on the amount of carbon (by weight) relative to the total weight of the respective pre-catalyst or support, and can be determined via CHN analysis.

The titanated chromium/silica pre-catalyst and the titanated silica support are generally in the form of free-flowing powders or particulates. Nonetheless, these titanated chromium/silica pre-catalyst and titanated silica support materials can contain entrained water/moisture, such that on a weight basis, the titanated chromium/silica pre-catalyst and the titanated silica support, independently, can contain from 0.5 to 12 wt. % water/moisture. More often, the amount of water/moisture ranges from 1 to 11 wt. %, from 2.5 to 10 wt. %, from 3 to 9 wt. %, or from 5 to 8 wt. %. These weight percentages are based on the amount of water/moisture relative to the total weight of the respective pre-catalyst or support, and can be determined using thermogravimetric analysis (TGA).

A representative and non-limiting example of a titanated chromium/silica catalyst consistent with this invention can comprise silica, from 0.1 to 5 wt. % chromium, from 0.1 to 10 wt. % titanium, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica, wherein at least 60 wt. % of the chromium is present in an oxidation state of +6. Another non-limiting example of a representative titanated chromium/silica catalyst of this invention can comprise silica, from 0.1 to 5 wt. % chromium, and from 0.1 to 10 wt. % titanium, wherein at least 60 wt. % of the chromium is present in an oxidation state of +6, and the catalyst is characterized by a HLMI (g/10 min) of the polymer that is greater than the equation $Y (HLMI) = (-9.6153x^3 + 21.088x^2 + 25.835x + 5.7983)$, wherein x is the number of titanium atoms per square nanometer of silica surface area for the titanated chromium/silica catalyst. Herein, the "catalyst" is distinguished from the "pre-catalyst" and is meant to indicate that the catalyst has been activated or calcined (an activated catalyst), thus all or a large portion of lower oxidation state chromium has been converted to an oxidation state of +6 (hexavalent chromium). Hence, the "catalyst" can be formed by activating or calcining the "pre-catalyst."

As it pertains to this titanated chromium/silica catalyst, at least 60 wt. % of the chromium is present in an oxidation state of +6. In one aspect, at least 70 wt. %, at least 75 wt. % in another aspect, at least 80 wt. % in another aspect, at least 85 wt. % in another aspect, at least 90 wt. % in yet another aspect, and at least 95 wt. % in still another aspect, of the chromium of the titanated chromium/silica catalyst can be present in an oxidation state of +6. The amount of Cr(VI) can be determined by mixing 2 g of the catalyst with 20 mL of a solution of 2 M $H_2SO_4$, then adding 5 drops of ferroin Fe(+3) indicator. This usually turns the mixture a blue-green color indicating the presence of Fe(III) ions. Next, the mixture is titrated to the ferroin endpoint (red color) using a solution of ferrous ammonium sulfate, which has been previously calibrated by reaction with a standardized 0.1 M sodium dichromate solution. When the mixture turns red, the end point is reached, the titrant volume is recorded, and the oxidation capacity of the catalyst is calculated and expressed as wt. % Cr(VI).

After calcining/activating, there is generally very little water/moisture present on the titanated chromium/silica catalyst, for instance, less than or equal to 3 wt. % water/moisture, based on the total weight of the catalyst. More often, the titanated chromium/silica catalyst has a water/moisture content of less than or equal to 2 wt. %, less than or equal to 1.5 wt. %, less than or equal to 1 wt. %, or less than or equal to 0.5 wt. %, and the like. The disclosed titanated chromium/silica catalysts also can contain an alkali metal and/or zinc at a molar ratio of alkali metal:titanium or zinc:titanium from 0.02:1 to 3:1, or also can contain an alkali metal and/or zinc at an amount in a range from 0.01 to 2 mmol of alkali metal or zinc per gram of the silica, or both.

In an aspect, the titanated chromium/silica catalyst can be characterized as having a melt index potential (MIP) of, that is by producing a polymer of, HILMI (g/10 min) that is greater than the equation Y (HLMI)=$(-9.6153x^3+21.088x^2+25.835x+5.7983)$, wherein x is the number of titanium atoms per square nanometer of silica surface area for the titanated chromium/silica catalyst. This is illustrated graphically in FIG. 1, and discussed further in the examples that follow. In some aspects, the titanated chromium/silica catalyst can be characterized by a HLMI (g/10 min) of the polymer that is greater than $Y=1.1*(-9.6153x^3+21.088x^2+25.835x+5.7983)$; alternatively, $Y=1.15*(-9.6153x^3+21.088x^2+25.835x+5.7983)$; alternatively, $Y=1.2*(-9.6153x^3+21.088x^2+25.835x+5.7983)$; or alternatively, $Y=1.3*(-9.6153x^3+21.088x^2+25.835x+5.7983)$. As it pertains to these equations, generally, the pore volume of the catalyst is less than or equal to 2.2, 2.0, 1.8 or 1.6 mL/g; the catalyst is activated/calcined for 3 hr in dry air at 650° C.; and the polymer produced in isobutane diluent at 105° C. and 550 psig (3792 kPa) ethylene pressure, at a productivity of ~3000 g polymer/g catalyst (e.g., at least 2500, 2800, 3000, or 3200 g polymer/g catalyst).

The amount of chromium in the titanated chromium/silica pre-catalysts and titanated chromium/silica catalysts disclosed herein is not particularly limited. Generally, however, the amount of chromium in the respective pre-catalyst or catalyst can range from 0.1 to 5 wt. %; alternatively, from 0.3 to 3 wt. %; alternatively, from 0.4 to 2 wt. %; alternatively, from 0.5 to 1.5 wt. %; or alternatively, from 0.7 to 1.5 wt. %. These weight percentages are based on the amount of chromium relative to the total weight of the respective pre-catalyst or catalyst.

Referring now to the titanated silica support, the titanated chromium/silica pre-catalyst, and the titanated chromium/silica catalyst, the amount of titanium present also is not particularly limited. Generally, however, the amount of titanium in the respective support, pre-catalyst, or catalyst can range from 0.1 to 10 wt. %; alternatively, from 0.5 to 7 wt. %; alternatively, from 0.5 to 3 wt. %; alternatively, from 0.8 to 2 wt. %; alternatively, from 1 to 6 wt. %; or alternatively, from 1.5 to 4 wt. %. These weight percentages are based on the amount of titanium relative to the total weight of the respective support, pre-catalyst, or catalyst. As disclosed herein, due to the catalyst preparation processes utilizing alkali metals (or zinc) and peroxides, lower titanium loadings are needed to achieve a particular HLMI value of the resultant polymer, as compared to traditional titanated chromium catalysts.

The alkali metal or zinc is a very minor component of the support or catalyst, although its impact on catalyst performance is very significant. The respective support, pre-catalyst, or catalyst contains any suitable amount of the alkali metal or zinc, often at a minimum molar ratio of alkali metal:titanium or zinc:titanium of 0.02:1, 0.05:1, 0.08:1, 0.1:1, 0.12:1, 0.15:1, or 0.2:1, and additionally or alternatively, a maximum molar ratio of 3:1, 2.5:1, 2.2:1, 2:1, or 1.8:1. Generally, the molar ratio of alkali metal:titanium or zinc:titanium can range from any minimum molar ratio to any maximum molar ratio described herein. For instance, representative and non-limiting examples of suitable ranges for the molar ratio include from 0.02:1 to 3:1, from 0.08:1 to 3:1, from 0.1:1 to 3:1, from 0.12:1 to 3:1, from 0.2:1 to 3:1, from 0.02:1 to 2.5:1, from 0.05:1 to 2.5:1, from 0.12:1 to 2.5:1, from 0.15:1 to 2.5:1, from 0.05:1 to 2.2:1, from 0.1:1 to 2.2:1, from 0.2:1 to 2.2:1, from 0.02:1 to 2:1, from 0.05:1 to 2:1, from 0.1:1 to 2:1, from 0.12:1 to 2:1, from 0.15:1 to 2:1, from 0.2:1 to 2:1, from 0.02:1 to 1.8:1, from 0.08:1 to 1.8:1, from 0.1:1 to 1.8:1, from 0.12:1 to 1.8:1, from 0.15:1 to 1.8:1, or from 0.2:1 to 1.8:1. This molar ratio is determined by ICP analysis.

Additionally or alternatively, the respective support, pre-catalyst, or catalyst contains any suitable amount of the alkali metal or zinc, often at a minimum amount of the alkali metal or zinc per gram of silica of 0.01, 0.02, 0.04, 0.08, 0.1, 0.11, 0.13, or 0.15 mmol/g, and additionally or alternatively, a maximum amount of 2, 1.5, 1.2, 1, 0.9, or 0.8 mmol/g. Generally, the amount of the alkali metal or zinc can range from any minimum amount in mmol/g to any maximum amount in mmol/g described herein. For instance, representative and non-limiting examples of suitable ranges for the amount of alkali metal or zinc (mmol/g) include from 0.01 to 2, from 0.02 to 2, from 0.08 to 2, from 0.1 to 2, from 0.11 to 2, from 0.13 to 2, from 0.15 to 2, from 0.01 to 1.5, from 0.04 to 1.5, from 0.11 to 1.5, from 0.01 to 1.2, from 0.04 to 1.2, from 0.1 to 1.2, from 0.11 to 1.2, from 0.15 to 1.2, from 0.01 to 1, from 0.04 to 1, from 0.08 to 1, from 0.1 to 1, from 0.11 to 1, from 0.13 to 1, from 0.15 to 1, from 0.02 to 0.9, from 0.08 to 0.9, from 0.11 to 0.9, from 0.15 to 0.9, from 0.01 to 0.8, from 0.02 to 0.8, from 0.04 to 0.8, from 0.1 to 0.8, from 0.11 to 0.8, or from 0.13 to 0.8 mmol/g. The alkali metal (or zinc) content is based on the mmol of the alkali metal (or zinc) versus the total weight of the silica in the respective support, pre-catalyst, or catalyst (in grams). This is determined via ICP analysis.

In one aspect, the support, pre-catalyst, or catalyst can contain the alkali metal, and in another aspect, the support, pre-catalyst, or catalyst can contain zinc. The alkali metal present on the respective support, pre-catalyst, or catalyst can be (or can comprise) cesium, lithium, sodium, or potassium, as well as any combination thereof. Thus, the alkali metal can be (or can comprise) lithium; alternatively, sodium; or alternatively, potassium. It is unexpected that the presence of alkali metals on the pre-catalyst and catalyst, particularly at the amounts noted above, does not destroy the catalyst activity, since sodium and other such metals are typically catalyst poisons.

Nitrogen also can be present on the respective support, pre-catalyst, or catalyst, depending upon the nature of the materials used during catalyst preparation and the chromium source/precursor, among other factors. While not limited thereto, the respective support, pre-catalyst, or catalyst can contain from 0.01 to 1.5 wt. % N, such as from 0.1 to 1.5 wt.

%, from 0.3 to 1 wt. %, from 0.4 to 1.2 wt. %, from 0.4 to 1 wt. %, or from 0.5 to 0.7 wt. % N, and the like. These weight percentages are based on the total weight of the respective support, pre-catalyst, or catalyst, and can be determined via CHN analysis.

By weight, the vast majority of the respective support, pre-catalyst, or catalyst is silica, often at least 70 wt. %, at least 80 wt. %, at least 85 wt. %, or at least 90 wt. %. Illustrative and non-limiting ranges for the amount of silica of the respective support, pre-catalyst, or catalyst include from 70 to 99.5 wt. %, from 80 to 98 wt. %, from 80 to 95 wt. %, from 85 to 98 wt. %, from 85 to 95 wt. %, from 90 to 99.5 wt. %, or from 90 to 98 wt. %, and the like.

The pore volumes of the titanated silica support, the titanated chromium/silica pre-catalyst, and the titanated chromium/silica catalyst are not particularly limited. For instance, the respective support, pre-catalyst, or catalyst can have a pore volume (total pore volume via nitrogen sorption) in a range from 0.5 to 3 mL/g, from 0.8 to 2.5 mL/g, from 1 to 2 mL/g, or from 1.3 to 1.8 mL/g, and so forth. Likewise, the surface areas of the titanated silica support, the titanated chromium/silica pre-catalyst, and the titanated chromium/silica catalyst are not limited to any particular range. Generally, however, the respective support, pre-catalyst, or catalyst can have a BET surface area in a range from 100 to 700 $m^2/g$, from 150 to 650 $m^2/g$, from 200 to 600 $m^2/g$, or from 250 to 550 $m^2/g$, and the like.

The titanated silica support, the titanated chromium/silica pre-catalyst, and the titanated chromium/silica catalyst can have any suitable particle size, as would be recognized by those of skill in the art. Illustrative and non-limiting ranges for the average (d50) particle size of the respective support, pre-catalyst, or catalyst can include from 15 to 350 μm, from 25 to 300 μm, from 40 to 120 μm, from 50 to 200 μm, or from 75 to 150 μm.

Unexpectedly, and unlike other aqueous based catalyst preparation procedures, the titanium is adsorbed onto the silica for the disclosed supports, pre-catalysts, and catalysts. The adsorbed titanium and the color changes observed during catalyst preparation are described in the examples that follow.

Also, for the disclosed supports, pre-catalysts, and catalysts, at least a portion of the zinc or the alkali metal is bound (chemically) to the titanium. For instance, while not being bound by theory, it is believed that at least a portion of the sodium (or other alkali metal, or zinc) is bound to the titanium through an oxygen atom. Additionally or alternatively, at least a portion of the zinc and the titanium is present as zinc titanate and/or at least a portion of the alkali metal and the titanium is present as an alkali metal titanate, one example of which is sodium titanate. These features can be determined using suitable analytical techniques such as XPS and XRD.

Polymerization Processes

Titanated chromium/silica catalysts (activated) of the present invention can be used to polymerize olefins to form homopolymers, copolymers, terpolymers, and the like. One such process for polymerizing olefins can comprise contacting any (activated) titanated chromium/silica catalyst disclosed herein (e.g., produced by any process disclosed herein) and an optional co-catalyst with an olefin monomer and an optional olefin comonomer in a polymerization reactor system under polymerization conditions to produce an olefin polymer.

The polymerization processes disclosed herein often can employ a co-catalyst. In some aspects, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than one co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, isobutylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used with the catalysts of this invention are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485.

Unsaturated monomers that can be employed with the titanated chromium/silica catalysts and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the titanated chromium/silica catalysts of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from 0.01 to 50 weight percent, based on the total weight of the monomer and comonomer. According to another aspect of the present invention, the amount of comonomer introduced into a polymerization reactor system can be from 0.01 to 40 weight percent comonomer, based on the total weight of the monomer and comonomer, or alternatively, from 0.1 to 35 weight percent comonomer, or from 0.5 to 20 weight percent comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the titanated chromium/silica catalysts of this invention can be used in the polymerization of diolefin compounds including, but not limited to, 1,3-butadiene, isoprene, 1,4-pentadiene, and 1,5-hexadiene.

The titanated chromium/silica catalysts of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). For instance, the polymerization reactor system can comprise a solution reactor, a gas-phase reactor, a slurry reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327.

According to still another aspect, the polymerization reactor system can comprise a high pressure polymerization reactor, e.g., can comprise a tubular reactor or an autoclave reactor. Tubular reactors can have several zones where fresh monomer, initiators, or titanated chromium/silica catalysts are added. Monomer can be entrained in an inert gaseous stream and introduced at one zone of the reactor. Initiators, titanated chromium/silica catalysts, and/or catalyst components can be entrained in a gaseous stream and introduced at another zone of the reactor. The gas streams can be intermixed for polymerization. Heat and pressure can be employed appropriately in such high pressure polymerization reactors to obtain optimal polymerization reaction conditions.

According to yet another aspect, the polymerization reactor system can comprise a solution polymerization reactor, wherein the monomer/comonomer can be contacted with the catalyst by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures (e.g., up to between 150° C. and 180° C.) and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some aspects, the polymerization reactor system can comprise any combination of a raw material feed system, a feed system for catalyst and/or catalyst components, and/or a polymer recovery system, including continuous systems. In other aspects, suitable reactor systems can comprise systems for feedstock purification, catalyst storage and preparation, extrusion, reactor cooling, polymer recovery, fractionation, recycle, storage, loadout, laboratory analysis, and process control.

Polymerization conditions that can be monitored, adjusted, and/or controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from 60° C. to 280° C., for example, from 60° C. to 185° C., from 60° C. to 120° C., or from 130° C. to 180° C., depending upon the type of polymerization reactor, the polymer grade, and so forth. In some reactor systems, the polymerization reactor temperature generally can be within a range from 70° C. to 110° C., or from 125° C. to 175° C. Various polymerization conditions can be held substantially constant, for example, for the production of a particular grade of olefin polymer.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 psig to 500 psig range (1.4 MPa to 3.4 MPa). High pressure polymerization in tubular or autoclave reactors generally can be conducted at 20,000 psig to 75,000 psig (138 MPa to 517 MPa). Polymerization reactors can also be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

Aspects of this invention also are directed to olefin polymerization processes conducted in the absence of added hydrogen. An olefin polymerization process of this invention can comprise contacting a titanated chromium/silica catalyst and an optional co-catalyst with an olefin monomer and optionally an olefin comonomer in a polymerization reactor system under polymerization conditions to produce an olefin polymer, and wherein the polymerization process is conducted in the absence of added hydrogen (no hydrogen is added to the polymerization reactor system). As one of ordinary skill in the art would recognize, hydrogen can be generated in-situ by certain catalyst systems in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a titanated chromium/silica catalyst and an optional co-catalyst with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from 0.05 to 20 mole %, from 0.1 to 15 mole %, from 0.25 to 10 mole %, or from 0.5 to 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within +/−25% during the polymerization run. Further, the addition of comonomer (or comonomers) can be, and generally is, substantially constant throughout the polymerization run for a particular polymer grade. However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements. This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, while in another aspect, the olefin polymer can comprise an ethylene/1-butene copolymer, an ethylene/1-hexene copolymer, and/or an ethylene/1-octene copolymer, while in yet another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Ethylene polymers produced in accordance with this invention can have a melt index (MI) of less than or equal to 100 g/10 min. Suitable ranges for the MI can include, but are not limited to, from 0.1 to 10, from 0.2 to 5, or from 0.25 to 2 g/10 min, and the like. Additionally or alternatively, the ethylene polymers can have a high load melt index (HLMI) of from 1 to 1000, from 5 to 500, from 6 to 40, from 8 to 60, from 10 to 100, or from 12 to 50 g/10 min, and the like.

The densities of ethylene-based polymers produced using the titanated chromium/silica catalysts and the processes disclosed herein often are greater than or equal to 0.91 g/cm$^3$. In one aspect of this invention, the density of the ethylene polymer can be in a range from 0.92 to 0.965 g/cm$^3$. Yet, in another aspect, the density can be in a range from 0.93 to 0.96 g/cm$^3$, such as, for example, from 0.935 to 0.955 g/cm$^3$, or from 0.94 to 0.95 g/cm$^3$.

In an aspect, ethylene polymers described herein can have a ratio of Mw/Mn, or the polydispersity index, of greater than or equal to 5, greater than or equal to 7, or greater than or equal to 9. Often, the Mw/Mn can range up to 15-30, or equal to 9. Often, the Mw/Mn can range up to 15-30, therefore, non-limiting ranges for Mw/Mn include from 5 to 30, from 7 to 25, from 9 to 20, from 10 to 25, or from 10 to 15, and the like. Additionally or alternatively, the ethylene polymer can have a Mw in a range from 10 to 500 kg/mol, and more often, from 30 to 300, from 50 to 400, from 50 to 250, from 80 to 200, or from 100 to 250 kg/mol. Additionally or alternatively, the ethylene polymer can have a Mn in a range from 1 to 50 kg/mol, and more often, from 3 to 30, from 4 to 40, from 5 to 25, or from 8 to 20 kg/mol.

The Carreau-Yasuda "a" parameter (CY-a parameter) is particularly sensitive to small changes in LCB. In an aspect, ethylene polymers described herein can have a CY-a parameter in a range from 0.05 to 0.5, from 0.08 to 0.4, or from 0.1 to 0.3, while in another aspect, the ethylene polymers described herein can have a CY-a parameter in a range from 0.1 to 0.25 or from 0.15 to 0.25.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual— Process, Materials, Properties*, TAPPI Press, 1992.

Processes for Producing Titanated Silica Supports

Aspects of this invention are directed to processes for preparing a titanated silica support. A first process can comprise (or consist essentially of, or consist of) (i) contacting water, a peroxide compound, and a titanium precursor to form a first mixture, (ii) contacting a silica with the first mixture under conditions sufficient for titanium to adsorb onto the silica and form a second mixture, (iii) isolating a solid fraction from the second mixture, and (iv) drying the solid fraction to form the titanated silica support. A second process can comprise (or consist essentially of, or consist of) (a) contacting water, hydrogen peroxide, an alkali metal precursor and/or a zinc precursor, a nitrogen-containing compound, and a titanium precursor to form a first mixture, (b) contacting a silica with the first mixture under conditions sufficient for titanium to adsorb onto the silica and form a second mixture, (c) subjecting the second mixture to a reaction temperature in a range from 40 to 100° C., (d) isolating a solid fraction from the second mixture and washing the solid fraction, and (e) drying the solid fraction to form the titanated silica support. A third process can comprise (or consist essentially of, or consist of) (A) contacting water, hydrogen peroxide, an alkali metal precursor and/or a zinc precursor, and a titanium precursor to form a first mixture, (B) contacting a silica with the first mixture under conditions sufficient for titanium to adsorb onto the silica and form a second mixture, (C) subjecting the second mixture to a reaction temperature in a range from 40 to 100° C., (D) isolating a solid fraction from the second mixture and washing the solid fraction, and (E) drying the solid fraction to form the titanated silica support. In the second and third processes, the alkali metal precursor (or zinc precursor) is any suitable source of alkali metal (or zinc) or any compound that generates an alkali metal (or zinc) in water. The third process has very low emissions, since nitrogen compounds and organics (hydrocarbons) are not required.

Generally, the features of these processes (e.g., the relative amounts of the water, peroxides, alkali metal or zinc precursors, and titanium precursor; the alkali metal precursor; the titanium precursor; the pH; the characteristics of the silica; the reaction temperature; the isolating and washing techniques; and the features of the drying step, among others) are independently described herein and these features can be combined in any combination to further describe the disclosed processes to produce a titanated silica support. Moreover, additional process steps can be performed before, during, and/or after any of the steps in any of the processes disclosed herein, and can be utilized without limitation and in any combination to further describe these processes, unless stated otherwise. Further, any titanated silica supports produced in accordance with the disclosed processes are within the scope of this disclosure and are encompassed herein.

The specific peroxide compound used herein is not particularly limited and may be any peroxide compound suitable for providing effective titanation of the olefin polymerization catalyst and the pre-catalyst thereof. In an aspect, the peroxide compound comprises organic peroxides, diacyl peroxides, peroxydicarbonates, monoperoxycarbonates, peroxyketals, peroxyesters, dialkyl peroxides, hydroperoxides, peracids, or any combination thereof. In another aspect, the peroxide compound comprises hydrogen peroxide, di-tert-butyl peroxide, benzoyl peroxide, dicumyl peroxide, cumene hydroperoxide, tert-butyl hydroperoxide, phthaloyl peroxide, or any combination thereof. In yet another aspect, the peroxide compound comprises (or consists essentially or, or consists of) hydrogen peroxide.

In the first step of the first process, the second process, and the third process, the materials can be contacted or combined in any order of sequence to form the first mixture. For instance, the water and peroxide compound or hydrogen peroxide can be contacted first, followed by the alkali metal precursor (if used) and then the titanium precursor to form the first mixture, while in another aspect, the water and alkali metal precursor (if used) can be contacted first, followed by the peroxide and then the titanium precursor to form the first mixture. This step to form the first mixture can be performed at any suitable temperature (e.g., room temperature) and for any suitable period of time.

The first step of each of these processes can alternatively be described as forming a first mixture. Thus, step (i) of the first process can be described as forming a first mixture comprising (or consisting essentially of, or consisting of) water, a peroxide compound, and a titanium precursor, while step (a) of the second process can be described as forming a first mixture comprising (or consisting essentially of, or consisting of) water, hydrogen peroxide, an alkali metal precursor and/or a zinc precursor, a nitrogen-containing compound, and a titanium precursor, and step (A) of the third process can be described as forming a first mixture comprising (or consisting essentially of, or consisting of)

water, hydrogen peroxide, an alkali metal precursor and/or a zinc precursor, and a titanium precursor.

The relative amounts of the components in the first step are not particularly limited, so long as any component or reaction product does not adversely affect the porosity of the silica support and supported chromium catalyst in subsequent processing steps, discussed hereinbelow. Generally, the molar ratio of the peroxide compound or hydrogen peroxide to titanium (e.g., $H_2O_2$:Ti) in first step can fall within a range from 0.5:1 to 100:1, such as from 2:1 to 50:1, from 3:1 to 20:1, or from 5:1 to 11:1, and the like. Additionally or alternatively, the molar ratio of the alkali metal (or zinc) to titanium in the first step of the second process and the third process can fall within a range from 0.1:1 to 300:1, such as from 0.2:1 to 100:1, from 0.5:1 to 20:1, from 0.7:1 to 10:1, from 1:1 to 5:1, or from 1:1 to 3:1, and the like. Note that excess zinc or alkali metal, such as sodium, can be used during the first step, but can be subsequently washed out during a later step in the respective process. Additionally or alternatively, the weight ratio of titanium to water (Ti:$H_2O$) the first step of the first, second, and third processes can range from 0.0001:1 to 0.02:1 in one aspect, from 0.001:1 to 0.02:1 in another aspect, from 0.005:1 to 0.02:1 in yet another aspect, and from 0.03:1 to 0.07:1 in still another aspect.

The specific titanium source or precursor used in first step is not particularly limited. Consistent with certain aspects of this invention, the titanium precursor can comprise a Ti (III) compound and/or a Ti (IV) compound. Representative and non-limiting examples of suitable titanium precursors can include a titanium carboxylate (e.g., titanium oxalate, titanium glycolate, titanium lactate, titanium citrate, titanium malate), a titanium halide, a titanium oxide, a titanium hydroxide, a titanium alkoxide (e.g., titanium isopropoxide, titanium n-propoxide), a titanium sulfate, a titanium nitrate, a titanium oxy-compound (such as the oxysulfate (TiOSO$_4$), or the oxynitrate (TiO(NO$_3$)$_2$, or the oxychloride (TiOCl$_2$), etc.) and the like. Mixtures or combinations or two or more titanium compounds can be used as the titanium precursor. In some aspects contemplated herein, the titanium precursor can comprise TiOSO$_4$, Ti(OH)$_4$, Ti metal, Ti(OR)$_4$, TiO (OH)$_2$, TiO$_2$, and the like, as well as any mixture or combination thereof, while in other aspects, the titanium precursor can comprise TiOSO$_4$; alternatively, Ti(OH)$_4$; alternatively, Ti metal; alternatively, Ti(OR)$_4$; alternatively, a Ti acetylacetonate or derivative thereof; alternatively, TiO(OH)$_2$; or alternatively, TiO$_2$.

If a nitrogen-containing compound is used in the first step (e.g., the second process), illustrative and non-limiting examples include ammonia, ammonium hydroxide, an alkyl-substituted ammonium hydroxide, ammonium salts, amines, alkanolamines, and the like, and mixtures of two or more suitable nitrogen-containing materials can be utilized, if desired. The relative amount of the nitrogen-containing compound is not particularly limited, so long as a desirable pH is reached. However, typical weight ratios of the nitrogen-containing compound (e.g., NH$_3$) to titanium include from 5:1 to 300:1, from 10:1 to 200:1, from 25:1 to 150:1, or from 50:1 to 100:1, and so forth.

Often, the pH of the first mixture in the first step is balanced by the relative amounts of the titanium precursor and H$_2$O$_2$ (acid) versus the nitrogen-containing compound and the alkali metal precursor (base). Nonetheless, prior to contacting a silica with the first mixture in the second step, optionally these processes can further comprise a step of adjusting a pH of the first mixture to within a range of from 3 to 12. More often, the pH is adjusted to within a range from 3 to 10, from 4 to 12, from 4 to 10, or from 6 to 10, and the like.

A suitable silica is contacted with the first mixture in the second step. In one aspect, the silica is a pre-formed xerogel silica and can have any of the pore volume, surface area, and average particle size features disclosed hereinabove for the titanated silica supports and the titanated chromium/silica-pre-catalysts, such as a pore volume from 0.5 to 3 mL/g, a BET surface area from 100 to 700 m²/g, and an average (d50) particle size from 15 to 350 μm. The preformed silica used in the second step is not a colloid or sol, and typically contains less than or equal to 25 wt. %, water/moisture, and more often, less than or equal to 20 wt. %, less than or equal to 15 wt. %, or less than or equal to 10 wt. % water/moisture, based on the total weight of the silica. The preformed silica is typically in powder or bead form.

In another aspect, the silica contacted with the first mixture is a silica hydrogel, colloid, or sol, and in such instances, can contain at least 50 wt. % water, and in some aspects, at least 60 wt. %, at least 70 wt. %, or at least 80 wt. % water.

Any reasonable amount of the silica can be added to the first mixture in the second step to from the second mixture. In one aspect, for instance, the weight ratio of silica to water (silica:H₂O) can fall within a range from 0.001:1 to 1:1, while in another aspect, the weight ratio can range from 0.01:1 to 0.5:1, and in yet another aspect, the weight ratio can range from 0.05:1 to 0.4:1, and in still another aspect, the weight ratio can range from 0.1:1 to 0.3:1.

As discussed herein, and unlike other aqueous based catalyst preparation procedures, the titanium is adsorbed onto the silica in the second step of the first, second, and third processes. The adsorbed titanium is generally accompanied by a color change of the silica support—typically, initially white and changing to yellow upon adsorption of the Ti peroxo complex—that does not wash off the support in subsequent steps. It is believed that the yellow color is the result of adsorption of a peroxy complex of titanium, and the color changes observed during catalyst preparation are described in the examples that follow. Analysis of titanium on the silica and in the solution before and after adsorption demonstrate that the titanium is definitely adsorbed, usually quantitatively, onto the silica as part of the catalyst preparation. When the Ti is not adsorbed, such as when the contact time is insufficient, then the MI potential of the final catalyst is usually low, indicating that the Ti did not attach to the silica surface in the desired way. If adsorption does not happen, the Ti can also be washed out later in subsequent steps.

This step to form the second mixture in which the titanium is adsorbed onto the silica can be conducted under any conditions suitable for the titanium to absorb onto the silica (e.g., accompanying color change to the silica). Any suitable temperature (e.g., room temperature) and time can be used for this step, and at any suitable pH. The titanium adsorption can be determined by slurrying the solid fraction isolated from the second mixture (discussed further below) in water, filtering the slurry, often leaving yellow solids on the filter, and a clear solution (filtrate) passing thru the filter. Spectroscopic analysis of the silica solids before and after this step can be used to measure the color change. The filtrate solution then can be acidified by adding 3 mL of concentrated H₂SO₄, bringing the pH to about 1, and adding 5 mL of 30% H₂O₂. This combination (acid and H₂O₂) results in a deep orange color if titanium is present in the filtrate. If no color change is observed, then the titanium has been adsorbed onto the silica. Spectroscopic analysis also can be used to measure the color change in the filtrate, if any.

The first and second steps in the first, second, and third processes generally use an aqueous medium, where substantially no hydrocarbons or alcohol solvents are present. For instance, the first mixture and the second mixture can contain less than or equal to 20 wt. % hydrocarbons and alcohols, such as less than or equal to 10 wt. %, less than or equal to 5 wt. %, less than or equal to 2 wt. %, or less than or equal to 1 wt. % hydrocarbons and alcohols.

Although not required, the second mixture containing the silica support is subjected to a reaction temperature in a range from 40 to 100° C. in the third step—step (c) and step (C)—of the second and third processes. Other representative and non-limiting ranges for the reaction temperature can include from 50° C. to 100° C., from 60° C. to 100° C., from 70° C. to 100° C., or from 80° C. to 100° C. These temperature ranges also are meant to encompass circumstances where this step is performed at a series of different temperatures, instead of at a single fixed temperature, falling within the respective temperature ranges, wherein at least one temperature falls within the respective ranges. If the second step is performed at room temperature, then the resulting second mixture is heated to the desired reaction temperature. In some aspects, the reaction temperature can be controlled by heating to the boiling point of the solvent, e.g., refluxing.

The time period for which the second mixture is subjected to the reaction temperature is not particularly limited, and can be performed for any suitable period of time. In some aspects, the time period can range from 10 min to 4 days or from 20 min to 2 days. In other aspects, the time period can range from 30 min to 24 hr or from 40 min to 2 hr.

In step (iii), step (d), and step (D) of the respective first process, second process, and third process, a solid fraction is isolated from the second mixture, and optionally the solid fraction is washed. Referring first to isolating the solid fraction (e.g., removing water), any suitable technique can be used, and illustrative examples include filtering, settling, decanting, pressing, centrifuging, cycloning, hydrocycloning, and the like. Two or more of these techniques can be used, and the isolating step can be performed batchwise or continuously, and at any suitable temperature (e.g., from 25° C. to 100° C.).

If washed, the solid fraction is washed one or more times with any suitable wash solution. While not limited thereto, the wash solution can contain water, an alcohol (e.g., ethanol), or a mixture thereof. As an example, the solid fraction can be washed one or more times with water and one or more times with an alcohol, and in any order or sequence. Similar to the isolating step, washing can be performed batchwise or continuously, and at any suitable temperature (e.g., from 25° C. to 100° C.). Other organic solvents also can be used, such as ketones or glycols, for washing either alone or in mixtures with water or other solvents. The washing step may include one or more steps where the solid fraction is redispersed in a solution. The redispersing solution can contain the filtrate, water, an alcohol (e.g., ethanol), or a mixture thereof. This solution also can contain a dilute acid, such as any suitable acid, e.g., nitric acid or acetic acid. While not wishing to be bound by theory, it is believed that the washing step removes loosely bound surface titanium and alkali metal species (if present). However, it is believed that even after washing, some of the sodium remains adsorbed to the inventive supports (or inventive pre-catalysts) and does not wash away. The relatively high amount of sodium present is unexpected, since sodium at these high levels is normally a catalyst poison.

Drying the solid fraction to form the titanated silica support can encompass a wide range of drying times, drying temperatures, and drying pressures, depending upon the drying device or technique that is utilized. For example, the drying time can range from 1 sec to 1 day, from 1 hr to 12 hr, from 2 hr to 8 hr, or from 0.1 to 5 sec, and the drying temperature can range from 25° C. to 200° C., from 50° C. to 150° C., from 70° C. to 120° C., or from 90° C. to 110° C. The drying pressure can be at or around atmospheric pressure, but in many instances, the drying step can be conducted under vacuum conditions at any suitable sub-atmospheric pressure, such as less than 100 torr (13.3 kPa), less than 50 (6.67 kPa) torr, or less than 10 torr (1.33 kPa).

Various types of drying techniques can be used for the drying step, such as spray drying, tray drying, flash drying, freeze drying, oven drying, or microwave drying, although not limited thereto. In one aspect, the drying step comprises spray drying, while in another aspect, the drying step comprises flash drying.

Processes for Producing Titanated Chromium Silica Catalysts

Aspects of this invention also are directed to processes for preparing titanated chromium/silica pre-catalysts and titanated chromium/silica catalysts. One such process for preparing a titanated chromium/silica pre-catalyst can comprise performing any of the processes to prepare a titanated silica support disclosed hereinabove (e.g., the first process, the second process, or the third process), and contacting a chromium precursor with the first mixture or the second mixture in any step prior to the step of isolating the solid fraction from the second mixture. Another process for preparing a titanated chromium/silica pre-catalyst can comprise performing any of the processes to prepare a titanated silica support disclosed hereinabove, and contacting a chromium precursor with the solid fraction after isolating the solid fraction from the second mixture (and this can be accomplished before or after drying the solid fraction). For instance, after drying to form the titanated silica support (dried), the chromium precursor can be contacted (e.g., wet or dry mix) with the titanated silica support, and optionally dried if needed. In yet another process, a chromium/silica pre-catalyst (pre-formed) is used instead of silica, and in the aspect, the process to prepare the titanated chromium/silica pre-catalyst can comprise performing any of the processes to prepare a titanated silica support disclosed hereinabove (e.g., the first process, the second process, or the third process), but instead of contacting the silica with the first mixture, contacting a chromium/silica pre-catalyst with the first mixture. Thus, rewording the first process for preparing a titanated silica support into a process for preparing a titanated chromium/silica pre-catalyst would comprise the following steps: (i) contacting water, a peroxide compound, and a titanium precursor to form a first mixture, (ii) contacting a chromium/silica pre-catalyst with the first mixture under conditions sufficient for titanium to adsorb onto the silica and form a second mixture, (iii) isolating a solid fraction from the second mixture, and (iv) drying the solid fraction to form the titanated chromium/silica pre-catalyst. Titanated chromium/silica pre-catalysts produced in accordance with any of these processes are within the scope of this disclosure and are encompassed herein.

Any suitable chromium source or chromium precursor can be used to form the titanated chromium/silica pre-catalyst. Consistent with certain aspects of this invention, the chromium precursor can comprise a chromium (II) compound, a chromium (III) compound, or any combination thereof. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) naphthenate, a chromium (III) halide, chromium (III) sulfate, chromium (III) nitrate, a chromium (III) dionate, and the like, as well as combinations thereof. In some aspects, the chromium precursor can comprise chromium (III) acetate, chromium (III) acetylacetonate, chromium (III) chloride, chromium (III) bromide, chromium (III) sulfate, chromium (III) nitrate, and the like, as well as combinations thereof.

In one aspect, the chromium precursor can comprise chromium trioxide, chromium acetate, chromium hydroxy acetate, chromium nitrate, or any combination thereof, while in another aspect, the chromium precursor can comprise chromium trioxide; alternatively, chromium acetate; alternatively, chromium hydroxy acetate; or alternatively, chromium nitrate.

While not required, it can be beneficial for the chromium precursor to be soluble in a suitable solvent, such as an alcohol, depending upon which step of the process is the chromium incorporation step. Similarly, and also not required, it can be beneficial for the chromium precursor compound to be soluble in water, and again, depending upon which step of the process is the chromium incorporation step.

The resulting titanated chromium/silica pre-catalysts can be converted to titanated chromium/silica catalysts via an appropriate activation step (often referred to as a calcining step). Thus, a representative process for preparing a titanated chromium/silica catalyst can comprise performing any process for preparing a titanated chromium/silica pre-catalyst disclosed hereinabove, and activating the titanated chromium/silica pre-catalyst to form the (activated) titanated chromium/silica catalyst. Further, any titanated chromium/silica catalysts produced in accordance with these processes are within the scope of this disclosure and are encompassed herein.

The activating step can be conducted at a variety of temperatures and time periods, which are generally selected to convert all or a large portion of the chromium to hexavalent chromium. Typical peak activation temperatures include the following representative ranges: from 400° C. to 900° C., from 500° C. to 850° C., from 600° C. to 800° C., from 600° C. to 700° C., and the like. In these and other aspects, these temperature ranges also are meant to encompass circumstances where the activation step is conducted at a series of different temperatures (e.g., an initial temperature, a peak temperature), instead of at a single fixed temperature, falling within the respective ranges. For instance, the activation step can start at an initial temperature, and subsequently, the temperature of the activation step can be increased to the peak temperature, for example, a peak temperature in a range from 500° C. to 850° C., or from 600° C. to 800° C.

The duration of the activation step is not limited to any particular period of time. Hence, this activation step can be conducted, for example, in a time period ranging from as little as 1 min to as long as 12-24 hr, or more. The appropriate activation time can depend upon, for example, the initial/peak temperature, among other variables. Generally, however, the activation step can be conducted in a time period that can be in a range from 1 min to 24 hr, from 1 hr to 12 hr, from 2 hr to 8 hr, or from 2 hr to 6 hr.

Catalyst activation is ordinarily performed in an oxidizing atmosphere, and the oxidizing atmosphere can comprise air, $O_2$, $N_2O$, $NO_2$, or NO, and any mixture or combination thereof. In some aspects, the activation atmosphere can comprise air (e.g., dry air), while in other aspects, the atmosphere can comprise a mixture of air and nitrogen. If desired, the titanated chromium/silica catalyst can be reduced using CO or a suitable hydrocarbon. Activation also can be accomplished by exposure to a non-oxidizing atmosphere first, followed by an oxidizing atmosphere, as described in U.S. Pat. No. 11,149,098. Any suitable activation vessel can be used for the activation step, which can be performed batchwise or continuous. For instance, fluidized bed, tray, trickle, and fixed bed vessels and associated techniques can be used for the activation step.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Titanium precursors. Approximately 35 g of titanium tetraisopropoxide solution was added to 200 mL water and stirred for 30 min. Then, water was removed by rotary evaporator and the resulting hydrous $TiO_2$ was dissolved in an oxalic acid solution with an oxalic acid to titanium molar ratio of 2:1. This solution is referred to herein as $TiO_2$-OA. Other titanium precursors were titanium tetraisopropoxide and titanium(IV) oxysulfate solution, used without further purification.

General procedure for aqueous titanation of a silica support and preparation of the pre-catalyst. The alkali metal salt was dissolved in water to form a ~0.17 M alkali solution. Then, a hydrogen peroxide solution was added to this alkali solution and stirred for few minutes. Then, the titanium precursor was added at an alkali metal:titanium molar ratio in the 0.7:1 to 1.9:1 range to form a homogenous solution. Next, an ammonium hydroxide solution was added to adjust the pH to a desired value in the 4-10 range. Then, a required amount of preformed silica A (typically 5 g) having a pore volume of 1.6 mL/g, a BET surface area of 500 m²/g, and a d50 average particle size of 80 μm, was added and if needed, the pH was re-adjusted with additional ammonium hydroxide solution. This mixture was then heated to a desired temperature (typically under reflux conditions, 100° C.) for a specified time (typically 1 hr). The resulting mixture was filtered through a glass frit by suction, and washed with water and ethanol. The resulting titanated silica support was then dried at room temperature. About 1 wt. % chromium was deposited onto the dried titanated silica by addition of chromium (III) acetate hydroxide (CrOAc) dissolved in methanol, followed by drying at room temperature, to form the titanated chromium/silica pre-catalyst.

Catalyst activation. The final titanated $Cr(VI)/SiO_2$ catalyst was obtained by activation of the above pre-catalyst in a 4.87-cm (1.88-inch) diameter activator tube by flowing dry air at a rate of 0.57-0.75 L/min (1.2-1.6 scfh) and ramping to 650° C. at a rate of 4° C./min and holding at 650° C. for 3 hr.

Polymerization Experiments. The polymerization tests were performed in a 2.65 L stainless-steel reactor equipped with a marine stirrer rotating at 500 rpm. The reactor was surrounded by a steel jacket through which water circulated being heated and cooled by hot (steam) and cold (plant water) heat exchangers to control the reaction temperature. A small amount of activated catalyst (0.05 to 0.10 g) was first loaded into the reactor under dry nitrogen. Next, 1.2 L of isobutane liquid was added and the reactor was heated to the set temperature of 105° C. Ethylene was then added to the reactor, which was maintained at 3.79 MPa (550 psig) throughout the course of the experiment. The reaction was continued until a productivity of ~3000 g of polyethylene per g of catalyst was reached, as determined by flow controllers measuring the flow of ethylene to the reactor. Once the target productivity was achieved, the time was noted, the ethylene flow was stopped, the reactor was cooled and depressurized, and the granular polymer powder was recovered. The dry powder was weighed, and catalyst activity was quantified as grams of polymer produced per gram of solid catalyst charged per hr (g/g/h).

Melt index (MI, g/10 min) was determined in accordance with ASTM D1238 at 190° C. with a 2.16 kg weight, $I_{10}$ (g/10 min) was determined in accordance with ASTM D1238 at 190° C. with a 10 kg weight, and high load melt index (HLMI, $I_{21}$, g/10 min) was determined in accordance with ASTM D1238 at 190° C. with a 21.6 kg weight. Density can be determined in grams per cubic centimeter (g/cm³) on a compression molded sample, cooled at 15° C. per minute, and conditioned for 40 hours at room temperature in accordance with ASTM D1505 and ASTM D4703.

Molecular weights and molecular weight distributions can be obtained using a PL-GPC 220 (Polymer Labs, an Agilent Company) system equipped with a IR4 detector (Polymer Char, Spain) and three Styragel® HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) is set at 1 mL/min, and polymer solution concentrations are in the range of 1.0-1.5 mg/mL, depending on the molecular weight. Sample preparation is conducted at 150° C. for nominally 4 hr with occasional and gentle agitation, before the solutions is transferred to sample vials for injection. An injection volume of 200 μL is used. The integral calibration method is used to deduce molecular weights and molecular weight distributions using a Chevron Phillips Chemical Company's HDPE polyethylene resin, MARLEX® BHB5003, as the broad standard. The integral table of the broad standard is pre-determined in a separate experiment with SEC-MALS. Mn is the number-average molecular weight, Mw is the weight-average molecular weight, Mz is the z-average molecular weight, Mv is viscosity-average molecular weight, and Mp is the peak molecular weight (location, in molecular weight, of the highest point of the molecular weight distribution curve).

Melt rheological characterizations can be performed as follows. Small-strain (less than 10%) oscillatory shear measurements are performed on an Anton Paar MCR rheometer using parallel-plate geometry. All rheological tests are performed at 190° C. The complex viscosity $|\eta^*|$ versus frequency ($\omega$) data are then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta*(\omega)| = \frac{\eta 0}{[1 + (\tau\eta\omega)^a]^{(1-n)/a}},$$

wherein: $|\eta*(\omega)|$ = magnitude of complex shear viscosity;

$\eta_0$ = zero shear viscosity;

$\tau_\eta$ = viscous relaxation time (Tau($\eta$));

$a$ = "breadth" parameter (CY–$a$ parameter);

$n$ = fixes the final power law slope, fixed at 2/11; and $\omega$ = angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987).

Metal contents, such as the amount of alkali metal, titanium, and chromium present on the catalyst, were determined by ICP analysis on a PerkinElmer Optima 8300 instrument. Samples were ashed in a Thermolyne furnace with sulfuric acid overnight, followed by acid digestion in a HotBlock with HCl and $HNO_3$ (3:1 v:v).

Examples 1-15

Table 1 summarizes comparative polymerization experiments with variable titanium loadings and sources/precursors, but with no alkali metal utilized during catalyst preparation. In Example 1, 0.21 g CrOAc dissolved in 5 mL of methanol was added to 5 g preformed silica A, dried at room temperature (RT), and activated in a flow of dry air in a fluidized bed at 650° C. for 3 hr.

In Example 2, 2.22 g $TiOSO_4$ was added to 20 mL water containing 2.5 g of 35 wt. % $H_2O_2$ solution and stirred for homogenization. Then, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

In Example 3, 0.60 g $Ti(OiPr)_4$ was added to 20 mL water containing 2.5 g of 35 wt. % $H_2O_2$ solution and stirred for homogenization. Then, ammonium hydroxide was added to increase the pH of the solution to 10. Next, 5 g preformed silica A was added and the mixture was heated to 100° C.

under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

In Examples 4-5, 0.25 g (for 5 wt. % Ti) or 0.50 g (for 10 wt. % Ti) titanium metal powder was added to a mixture containing 20 g of 30 wt. % $H_2O_2$ and 5 g of $NH_4OH$ solution and stirred for homogenization (typically 1.5-2 hr). Then, more ammonium hydroxide was added to increase the pH of the solution to 10. Next, 5 g preformed silica A was added and the mixture was heated to at 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

In Examples 6-11, depending on the concentration of the prepared $TiO_2$-OA solution, the amounts added varied from 1.7 mL (for 1 wt. % Ti) to 17 mL (for 10 wt. % Ti). Respectively, the amounts of 35 wt. % $H_2O_2$ added varied from 1.1 g to 10.3 g resulting in $H_2O_2$/Ti molar ratios of ~10.1-10.8, except Example 6. Then, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

For Examples 12-15, 0.60 g $Ti(OiPr)_4$ was added to a mixture containing 50 mL $H_2O$, 2.5 g of 35 wt. % $H_2O_2$, and complexing agents 0.50 g glycolic acid (Example 12), or 0.50 g lactic acid (Example 13), or 0.89 g citric acid (Example 14), or 0.53 g oxalic acid (Example 15). Then, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

The Ti loadings in Table 1, Examples 2-15, varied from 1-10 wt. % by varying the amounts of the Ti-source added. The pre-catalysts were prepared at a pH of 10, heated to 100° C. under reflux for a period of 1 hr. The activated catalysts showed an increasing HLMI potential with Ti loading, but higher Ti loadings of 7-10 wt. % were needed to reach HLMI values over 30.

TABLE 1

| Ex | $H_2O_2$/Ti | Ti Source | Ti wt. % | Prod. (g/g) | Activity (g/g/h) | HLMI | $I_{10}$ | MI |
|---|---|---|---|---|---|---|---|---|
| 1 | None | None, Control Run | 0 | 2892 | 2066 | 6.3 | 1.2 | 0.06 |
| 2 | 12.3 | $TiOSO_4$ | 2.0 | 2914 | 2797 | 12.0 | 2.3 | 0.10 |
| 3 | 12.3 | $Ti(OiPr)_4$ | 2.0 | 2915 | 2670 | 15.1 | 3.0 | 0.16 |
| 4 | 33.8 | Ti powder | 5.0 | 3060 | 2661 | 19.1 | 3.8 | 0.13 |
| 5 | 29.5 | Ti powder | 10.0 | 2912 | 2329 | 33.5 | 7.1 | 0.44 |
| 6 | 21.1 | $TiO_2$-OA | 8.0 | 4119 | 5747 | 34.9 | 6.9 | 0.34 |
| 7 | 10.8 | $TiO_2$-OA | 1.0 | 2954 | 2496 | 7.8 | 1.5 | 0.04 |
| 8 | 10.3 | $TiO_2$-OA | 5.0 | 3173 | 3282 | 14.0 | 2.3 | 0.10 |
| 9 | 10.1 | $TiO_2$-OA | 7.0 | 2948 | 3023 | 32.2 | 6.5 | 0.35 |
| 10 | 10.2 | $TiO_2$-OA | 8.5 | 3020 | 2970 | 32.9 | 6.3 | 0.30 |
| 11 | 10.1 | $TiO_2$-OA | 10.0 | 2971 | 2764 | 39.3 | 7.9 | 0.40 |

TABLE 1-continued

| Ex | $H_2O_2$/Ti | Ti Source | Ti wt. % | Prod. (g/g) | Activity (g/g/h) | HLMI | $I_{10}$ | MI |
|---|---|---|---|---|---|---|---|---|
| 12 | 12.3 | Ti(OiPr)$_4$ + Glycolic Acid | 2.0 | 2994 | 2461 | 14.0 | 2.7 | 0.10 |
| 13 | 12.3 | Ti(OiPr)$_4$ + Lactic Acid | 2.0 | 2904 | 2471 | 11.7 | 1.9 | 0.10 |
| 14 | 12.3 | Ti(OiPr)$_4$ + Citric Acid | 2.0 | 2949 | 2440 | 15.3 | 3.0 | 0.13 |
| 15 | 12.3 | Ti(OiPr)$_4$ + Oxalic Acid | 2.0 | 2906 | 3170 | 13.2 | 2.6 | 0.10 |

Examples 16-27

Table 2 summarizes catalyst preparation and polymerization experiments with variable titanium loadings using $TiO_2$-OA as the titanium source/precursor, and with $Na_2SiO_3$ utilized during catalyst preparation (molar ratios of $H_2O_2$/Ti and Na/Ti are listed in Table 2). In Examples 16-27, 0.55-2 g $Na_2SiO_3$ was added to a solution containing 10 mL water, 1-16.6 g of 35 wt. % $H_2O_2$, and 5 g of ammonium hydroxide. After stirring for a few min, the $TiO_2$-OA solution (depending on the concentration of this solution prepared, the amounts varied from 3.3 g for 2 wt. % Ti to 15.33 g for 9 wt. % Ti) was added. Next, 5 g preformed silica A was added and if needed, pH was readjusted to 10 and the mixture was heated to 100° C. under reflux for 1 hr. The actual amounts of $Na_2SiO_3$, $H_2O_2$, and silica in grams are summarized in Table 2. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr. The polymerization experiments in Table 2 reveal a 2-3× increase in the HLMI potential compared to catalysts prepared without a sodium source (see Examples 6-11 in Table 1), signifying the beneficial and unexpected role of addition of sodium during catalyst preparation.

(~1.1 g for 1 wt. % Ti, 2.2 g for 2 wt. % Ti, 4 g for 3.5 wt. % Ti, and 5.8 g for 5 wt. % Ti) was added. Then, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

In Examples 36-41, 0.05 g (Example 36), or 0.10 g (Example 37), or 0.20 g (Example 38), or 0.35 g (Example 39), or 0.50 g (Example 40), or 0.80 g (Example 41), of NaCl was dissolved in 20 mL water. Then, 35 wt. % $H_2O_2$ 0.5 g (Example 36), or 1.0 g (Example 37), or 2.0 g (Example 38), or 3.5 g (Example 39), or 5.0 g (Example 40), or 8.0 g (Example 41) was added. Then, $TiOSO_4$ (~0.55 g for 0.5 wt. % Ti, 1.1 g for 1 wt. % Ti, 2.2 g for 2 wt. % Ti, 3.9 g for 3.5 wt. % Ti, 5.8 g for 5 wt. % Ti, and 9.3 g for 8 wt. % Ti) was added. Then, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of

TABLE 2

| Ex | $gNa_2SiO_3$/$gH_2O_2$/$gSiO_2$ | Ti wt. % | $H_2O_2$/Ti | Alkali/Ti | Prod. (g/g) | Activity (g/g/h) | HLMI | $I_{10}$ | MI |
|---|---|---|---|---|---|---|---|---|---|
| 16 | 2/16.6/5 | 5.0 | 32.7 | 1.18 | 2866 | 2773 | 44.4 | 9.7 | 0.66 |
| 17 | 2/16.6/5 | 2.6 | 62.9 | 2.27 | 2966 | 2825 | 35.4 | 7.5 | 0.53 |
| 18 | 1/16.6/5 | 5.0 | 32.7 | 0.59 | 2948 | 3845 | 44.4 | 9.0 | 0.51 |
| 19 | 0.55/16.6/5 | 5.0 | 32.7 | 0.33 | 2921 | 4274 | 42.7 | 9.0 | 0.52 |
| 20 | 1/5/5 | 5.0 | 9.8 | 0.59 | 2705 | 4271 | 60.9 | 13.5 | 0.93 |
| 21 | 1/2.5/5 | 5.0 | 4.9 | 0.59 | 2677 | 2722 | 44.0 | 9.4 | 0.59 |
| 22 | 1/1/5 | 5.0 | 1.9 | 0.59 | 2981 | 3313 | 30.0 | 6.1 | 0.3 |
| 23 | 1/10/5 | 5.0 | 19.7 | 0.59 | 2611 | 1843 | 28.7 | 5.8 | 0.3 |
| 24 | 1/16.6/5 | 2.8 | 60.3 | 1.06 | 3292 | 4031 | 23.8 | 4.7 | 0.22 |
| 25 | 1/16.6/5 | 4.7 | 35.9 | 0.63 | 3220 | 4493 | 42.5 | 8.6 | 0.52 |
| 26 | 1/16.6/5 | 7.5 | 22.5 | 0.39 | 3227 | 3458 | 57.6 | 12.3 | 0.80 |
| 27 | 1/16.6/5 | 8.7 | 19.4 | 0.34 | 3159 | 3213 | 62.0 | 12.8 | 0.83 |

Examples 28-41

Table 3 summarizes catalyst preparation and polymerization experiments with variable titanium loadings using a $TiOSO_4$ solution as the titanium source/precursor, and with $NaHCO_3$ or NaCl utilized during catalyst preparation (other sodium precursors can be used, such as sodium carbonate). In Examples 28-35, 0.05 g (Example 30), or 0.14 g (Example 29), or 0.29 g (Examples 28 and 32-35), or 0.58 g (Example 31), or 0.29 g (Example 28) of $NaHCO_3$ was dissolved in 20 mL water. Then, 2.5 g of 35 wt. % $H_2O_2$ (for Examples 28-32), or 1.1 g of 35 wt. % $H_2O_2$ (for Example 33), or 4 g of 35 wt. % $H_2O_2$ (for Example 34), or 5.8 g of 35 wt. % $H_2O_2$ (for Example 35) was added. Then, $TiOSO_4$ methanol was added, RT dried, and activated in a flow of dry air in a fluidized bed at 650° C. for 3 hr.

The polymerization experiments in Table 3 demonstrate, surprisingly, that HLMI values in excess of 30 were readily achieved with only 2 wt. % titanium, under various catalyst preparation conditions. ICP compositional analysis also is summarized in Table 3. This information is shown graphically in FIG. 1, which is a plot of the HLMI of the polymer versus the number of titanium atoms per square nanometer for the control titanated chromium/silica catalysts and for the titanated chromium/silica catalysts of Examples 28-41.

The control catalysts in FIG. 1 were prepared from a silica having a surface area of 480 m$^2$/g, a pore volume of 1.67 mL/g, and an average particle size of 75 μm. Ten gram samples of this silica were placed in a muffle furnace at 200° C. for 12 hr. Then, these silica samples were captured in an air-tight bottle while the silica was still hot. The silica samples were then slurried in dry isopropyl alcohol, followed by the addition of titanium isopropoxide under constant stirring for 1 hr, after which a methanol solution of basic chromic acetate was added to result in 1 wt. % chromium for each catalyst. The slurry was dried under vacuum at 100° C. for 2 hr. The titanium isopropoxide was added in an amount to equal a set target ranging from 0.25 wt. % to 8 wt. % of titanium, based on the weight of the silica. Using the silica surface area (m$^2$/g) and converting to nm$^2$, these weight percentages were ultimately converted to atoms of Ti/nm$^2$ and resulted in the control line in FIG. 1 (for example, 2 wt. % titanium is 0.52 Ti/nm$^2$).

Invention set 1 in FIG. 1 is Examples 36-41, and Invention set 2 is Examples 28-35, where the surface area is 500 m$^2$/g (2 wt. % titanium is 0.50 Ti/nm$^2$). At equivalent titanium loadings, the titanated chromium/silica catalysts of Examples 36-41 resulted in significantly higher HLMI values as compared to the control, with unexpected increases of ~18 to 100% in HLMI at the same titanium loading. At low titanium loadings (e.g., 1-2 wt. % titanium), Invention set 2 also resulted in significantly higher HLMI values as compared to the control, with unexpected increases of ~60 to 90%. The higher titanium loading examples of Invention set 2 were comparable to the control; it is believed that a low Na/Ti molar ratio was the cause, and that higher HLMI values would have resulted if a higher ratio was used.

Examples 42-46

Table 4 summarizes catalyst preparation and polymerization experiments with a constant titanium loading using Ti(OiPr)$_4$ and complexing acids as the titanium source/precursor, and with NaCl utilized during catalyst preparation. In Examples 42-46 (compare with Examples 3 and 12-15), 0.2 g NaCl was dissolved in 50 mL water. Then, 2.5 g of 35 wt. % H$_2$O$_2$ and complexing agents 0.50 g glycolic acid (Example 44), or 0.50 g lactic acid (Example 43), or 0.89 g citric acid (Example 45), or 0.53 g oxalic acid (Example 46) were also added and solubilized. Then, 0.60 g Ti(OiPr)$_4$ was added and the pH of the solution was increased to 10 with addition of ammonium hydroxide. The molar ratio of H$_2$O$_2$/Ti and Alkali/Ti was 12.3:1 and 1.64:1, respectively. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

The polymerization experiments of Examples 42-46 in Table 4 demonstrate that HLMI values of 32-45 were readily achieved with only 2 wt. % titanium, whereas comparative Examples 3 and 12-15 produced polymers with HLMI values of only 11-15.

TABLE 3

| Ex | H$_2$O$_2$/ Ti | Alkali Source | Alkali/ Ti | Ti wt % | Prod. (g/g) | Activity (g/g/h) | HLMI | I$_{10}$ | MI |
|----|------|-------|------|-----|------|------|------|------|------|
| 28 | 12.3 | NaHCO$_3$ | 1.65 | 2.0 | 2863 | 2526 | 38.4 | 8.1 | 0.50 |
| 29 | 12.3 | NaHCO$_3$ | 0.80 | 2.0 | 2865 | 2233 | 23.4 | 4.9 | 0.26 |
| 30 | 12.3 | NaHCO$_3$ | 0.28 | 2.0 | 2917 | 2349 | 13.1 | 2.5 | 0.10 |
| 31 | 12.3 | NaHCO$_3$ | 3.30 | 2.0 | 2795 | 2298 | 44.7 | 9.5 | 0.60 |
| 32 | 12.3 | NaHCO$_3$ | 1.65 | 2.0 | 2956 | 2838 | 38.2 | 8.0 | 0.50 |
| 33 | 10.8 | NaHCO$_3$ | 3.30 | 1.0 | 3036 | 2698 | 24.7 | 5.0 | 0.20 |
| 34 | 11.3 | NaHCO$_3$ | 0.94 | 3.5 | 2937 | 2073 | 40.8 | 8.5 | 0.50 |
| 35 | 11.4 | NaHCO$_3$ | 0.66 | 5.0 | 2676 | 2632 | 49.6 | 9.9 | 0.60 |
| 36 | 9.8 | NaCl | 1.64 | 0.5 | 3089 | 3064 | 19.3 | 3.8 | 0.16 |
| 37 | 9.8 | NaCl | 1.64 | 1.0 | 2753 | 2430 | 24.3 | 4.8 | 0.25 |
| 38 | 9.8 | NaCl | 1.64 | 2.0 | 3058 | 2759 | 30.9 | 5.3 | 0.36 |
| 39 | 9.8 | NaCl | 1.64 | 3.5 | 2957 | 3113 | 48.5 | 10.3 | 0.60 |
| 40 | 9.8 | NaCl | 1.64 | 5.0 | 3043 | 3147 | 75.2 | 15.7 | 1.00 |
| 41 | 9.8 | NaCl | 1.64 | 8.0 | 2925 | 2639 | 76.4 | 16.0 | 1.10 |

| | Activated Catalyst (wt. %) | | |
|----|------|------|------|
| Ex | Ti | Na | Cr |
| 28 | 1.38 | 0.20 | 0.77 |
| 29 | 1.57 | 0.09 | 0.80 |
| 30 | 1.67 | 0.05 | 0.79 |
| 31 | 1.39 | 0.35 | 0.83 |
| 32 | 1.65 | 0.17 | 0.77 |
| 33 | 0.71 | 0.27 | 0.92 |
| 34 | 2.68 | 0.13 | 0.73 |
| 35 | 3.68 | 0.11 | 0.71 |
| 36 | 0.40 | 0.12 | 0.85 |
| 37 | 0.73 | 0.13 | 0.73 |
| 38 | 1.37 | 0.19 | 0.77 |
| 39 | 2.42 | 0.21 | 0.69 |
| 40 | 3.76 | 0.28 | 0.72 |
| 41 | 5.33 | 0.33 | 0.71 |

TABLE 4

| Ex | Ti Source | Ti wt % | Prod. (g/g) | Activity (g/g/h) | HLMI | $I_{10}$ | MI |
|---|---|---|---|---|---|---|---|
| 42 | Ti(OiPr)$_4$ | 2 | 2923 | 3218 | 44.9 | 9.7 | 0.60 |
| 43 | Ti(OiPr)$_4$ + Lactic Acid | 2 | 2924 | 3161 | 38.8 | 8.3 | 0.50 |
| 44 | Ti(OiPr)$_4$ + Glycolic Acid | 2 | 2948 | 2406 | 32.5 | 6.7 | 0.36 |
| 45 | Ti(OiPr)$_4$ + Citric Acid | 2 | 2997 | 3361 | 40.2 | 8.6 | 0.50 |
| 46 | Ti(OiPr)$_4$ + Oxalic Acid | 2 | 2955 | 2859 | 38.0 | 8.0 | 0.50 |

Examples 47-54

Table 5 summarizes catalyst preparation and polymerization experiments with various titanium loadings using $TiO_2$-OA as the titanium source/precursor, and with NaOH utilized during catalyst preparation. In Examples 47-54, to 20 mL water containing 2.5 g of 35 wt. % $H_2O_2$ and 3.3 g $TiO_2$-OA solution (for 2 wt. % Ti, Examples 47-51 and 54)

or 5.9 g $TiO_2$-OA solution (for 3.5 wt. % Ti, Examples 52-53), 1N NaOH solution was added in the amounts shown in Table 5. Then, ammonium hydroxide was added to increase the pH of the solution to 10 for Examples 47-53. For Example 54, no ammonium hydroxide was added; the pH was increased to 10 with 1N NaOH solution. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

As shown in Table 5, the HLMI values of the polymers produced from the titanated chromium/silica catalysts increased with increasing Na content during catalyst preparation (see Examples 47-51). Example 54 did not have any polymerization activity, and while not wishing to be bound by theory, it is believed that ammonium hydroxide plays an important role in both increasing pH as well as aiding/improving titanium incorporation (more effective titanation).

TABLE 5

| Ex | mL NaOH (1N) | $H_2O_2$/Ti | Alkali/Ti | Ti wt % | Prod. (g/g) | Activity (g/g/h) | HLMI | $I_{10}$ | MI |
|---|---|---|---|---|---|---|---|---|---|
| 47 | 0.45 | 12.32 | 0.20 | 2.0 | 2998 | 3634 | 11.7 | 2.1 | 0.09 |
| 48 | 0.85 | 12.32 | 0.40 | 2.0 | 2849 | 3196 | 20.3 | 4.0 | 0.20 |
| 49 | 1.65 | 12.32 | 0.79 | 2.0 | 2900 | 2617 | 32.2 | 6.7 | 0.40 |
| 50 | 3.30 | 12.32 | 1.59 | 2.0 | 3141 | 3732 | 39.5 | 8.5 | 0.50 |
| 51 | 6.50 | 12.32 | 3.16 | 2.0 | 3015 | 3173 | 47.1 | 10.6 | 0.70 |
| 52 | 3.50 | 12.32 | 1.68 | 3.5 | 3137 | 3655 | 48.3 | 10.4 | 0.70 |
| 53 | 7.00 | 7.04 | 1.91 | 3.5 | 2513 | 908 | 48.8 | 11.7 | 0.91 |
| 54 | 22.5 | 12.32 | 10.77 | 2 | 0 | 0 | 0 | 0 | 0 |

Examples 55-57

Table 6 summarizes catalyst preparation and polymerization experiments with a fixed titanium loading and $TiO_2$-OA titanium source/precursor, and different sodium sources utilized during catalyst preparation. In Examples 55-57, to 20 mL water containing 2.5 g of 35 wt. % $H_2O_2$ and 3.3 g $TiO_2$ solution (for 2 wt. % Ti,), 0.29 g $NaHCO_3$ for Example 55, or 0.26 g NaOAc for Example 56, or 0.23 g $Na_2C_2O_4$ for Example 57, was added, as shown in Table 6. Then, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

The polymerization experiments of Examples 55-57 in Table 6 demonstrate that HLMI values of 30-40 were readily achieved with only 2 wt. % titanium, regardless of the alkali metal source/precursor.

TABLE 6

| Ex | Alkali Precursor (g) | $H_2O_2$/Ti | Alkali/Ti | Ti wt % | Prod. (g/g) | Activity (g/g/h) | HLMI | $I_{10}$ | MI |
|---|---|---|---|---|---|---|---|---|---|
| 55 | $NaHCO_3$ (0.29 g) | 12.3 | 1.65 | 2 | 2921 | 2696 | 40.5 | 8.6 | 0.50 |
| 56 | NaOAc (0.26 g) | 12.3 | 1.52 | 2 | 2898 | 2973 | 30.8 | 6.4 | 0.35 |
| 57 | $Na_2C_2O_4$ (0.23 g) | 12.3 | 1.64 | 2 | 3018 | 3043 | 32.6 | 6.9 | 0.40 |

Examples 58-68

Table 7 summarizes catalyst preparation and polymerization experiments with potassium salts and Table 8 summarizes catalyst preparation and polymerization experiments with lithium salts. Pre-catalysts were prepared at a pH of 10 using ammonium hydroxide, heated to 100° C. under reflux for 1 hr, and the titanium source/precursor was $TiO_2$-OA. For Examples 58-62, 2.5 g of 35 wt. % $H_2O_2$ was added to 20 mL water, and a $TiO_2$-OA solution (3.3 g for a 2 wt. % Ti, Examples 58 and 60-62, or 8.52 g for 5 wt. % Ti, Example 59) was added. Then, 3.5 mL 1N KOH solution (for Examples 58-59), or 1.9 mL 1N KOH (for Example 60), or 2.8 mL 1N KOH solution (for Example 61), or 0.24 g $K_2CO_3$ (for Example 62) was added. Then, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

For Examples 63-68, to 50 mL water containing 2.5 g of 35 wt. % $H_2O_2$ and 5 g $NH_4OH$, 20 wt. % lithium polysilicate solution in the following amounts was added: 0.71 g (Example 63), 1.64 g (Example 64), 2.50 g (Example 65), 3.30 g (Example 66) 4.20 g (Example 67) and 5.0 g (Example 68). Then, 3.3 g of $TiO_2$-OA solution corresponding to 2 wt. % Ti was added, and if needed, ammonium hydroxide was added to increase the pH of the solution to 10. Next, 5 g preformed silica A was added and the mixture was heated to 100° C. under reflux for 1 hr. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

The polymerization experiments of Examples 58-68 in Tables 7-8 demonstrate that, unexpectedly, potassium and lithium usage during catalyst preparation also produced polymers having HLMI values of over 30 with only 2 wt. % titanium, in a manner similar to sodium. Tables 7-8 also summarize the results of ICP compositional analysis of the activated titanated chromium/silica catalysts: 0.78-0.92 wt. % chromium, 0.9-3 wt. % titanium, 0.4-0.8 wt. % potassium, and 0.03-0.2 wt. % lithium.

TABLE 8

| Ex | $H_2O_2$/Ti | Li/Ti | Ti wt % | Prod. (g/g) | Activity (g/g/h) | HLMI | $I_{10}$ | MI |
|---|---|---|---|---|---|---|---|---|
| 63 | 12.32 | 0.52 | 2 | 2905 | 4251 | 25.7 | 5.2 | 0.3 |
| 64 | 12.32 | 1.20 | 2 | 3048 | 4253 | 29.0 | 5.9 | 0.3 |
| 65 | 12.32 | 1.83 | 2 | 3252 | 4151 | 35.1 | 7.2 | 0.4 |
| 66 | 12.32 | 2.42 | 2 | 2982 | 3059 | 30.0 | 6.1 | 0.3 |
| 67 | 12.32 | 3.08 | 2 | 3003 | 2611 | 37.0 | 7.6 | 0.4 |
| 68 | 12.32 | 3.67 | 2 | 3005 | 2752 | 31.4 | 6.3 | 0.3 |

| | Activated Catalyst (wt. %) | | |
|---|---|---|---|
| Ex | Ti | Li | Cr |
| 63 | 1.19 | 0.03 | 0.87 |
| 64 | 1.09 | 0.06 | 0.83 |
| 65 | 1.00 | 0.08 | 0.80 |
| 66 | 1.20 | 0.17 | 0.80 |
| 67 | 1.21 | 0.20 | 0.81 |
| 68 | 0.91 | 0.19 | 0.78 |

Examples 69-78

Table 9 summarizes the effect of temperature on aqueous titanation while using NaOH or sodium silicate as the alkali metal source/precursor, and at Ti loadings of either 2 or 5 wt. %. Catalyst mixtures were heated at different temperatures from RT to reflux conditions (100° C.). The $H_2O_2$/Ti molar ratio was 32.7:1 and 12.3:1, respectively, for a Ti loading of 5 and 2 wt. %. Similarly, the Alkali/Ti molar ratio was 0.59:1 and 1.58:1, respectively, for a Ti loading of 5 and 2 wt. %. The Ti-source/precursor was $TiO_2$-OA. The melt index potential of the titanated chromium/silica catalysts prepared at lower temperatures can be improved by allowing a longer time for the catalyst mixture to react prior to separating the liquids from the solids and subsequent drying.

For Examples 69-73, to 20 mL water containing 16.6 g of 35 wt. % $H_2O_2$ and 5 g $NH_4OH$, 1 g sodium silicate solution was added. Then, 8.5 g of $TiO_2$-OA solution corresponding to 5 wt. % Ti was added, and if needed, ammonium hydroxide was added to increase the pH of the solution to 10. Next, 5 g preformed silica A was added and the mixture was heated at the temperatures for the time periods shown in Table 9. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

TABLE 7

| Ex | $H_2O_2$/Ti | Alkali Source | K/Ti | Ti wt % | Prod. (g/g) | Activity (g/g/h) | HLMI | $I_{10}$ | MI |
|---|---|---|---|---|---|---|---|---|---|
| 58 | 12.32 | KOH | 1.67 | 2.0 | 2772 | 3394 | 40.3 | 8.6 | 0.6 |
| 59 | 7.04 | KOH | 0.67 | 3.5 | 2979 | 3372 | 34.0 | 7.0 | 0.4 |
| 60 | 12.32 | KOH | 0.90 | 2.0 | 2638 | 4059 | 33.6 | 7.0 | 0.4 |
| 61 | 12.32 | KOH | 1.34 | 2.0 | 3076 | 2818 | 37.4 | 7.8 | 0.5 |
| 62 | 12.32 | $K_2CO_3$ | 1.66 | 2.0 | 3057 | 2983 | 34.5 | 7.5 | 0.45 |

| | Activated Catalyst (wt. %) | | |
|---|---|---|---|
| Ex | Ti | K | Cr |
| 58 | 1.69 | 0.77 | 0.89 |
| 59 | 2.97 | 0.73 | 0.89 |
| 60 | 1.51 | 0.45 | 0.92 |
| 61 | 1.70 | 0.70 | 0.87 |
| 62 | — | — | — |

For Examples 74-78, to 17 ml of water containing 2.5 g of 35 wt. % $H_2O_2$, 33 mL of 0.1N NaOH solution was added, and then 3.3 g of $TiO_2$-OA solution corresponding to 2 wt. % Ti. Then, ammonium hydroxide was added to increase the pH of the solution to 10. Next, 5 g preformed silica A was added and the mixture was heated at the temperatures for the time periods shown in Table 9. The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

TABLE 9

| Ex | Temp ° C. | Time hr | Alkali Source | Ti wt % | Prod. (g/g) | Activity (g/g/h) | HLMI | $I_{10}$ | MI |
|---|---|---|---|---|---|---|---|---|---|
| 69 | RT | 2.0 | $Na_2SiO_3$ | 5 | 2733 | 3279 | 9.7 | 1.8 | 0.05 |
| 70 | 40 | 2.0 | $Na_2SiO_3$ | 5 | 2893 | 3543 | 10.5 | 2.0 | 0.09 |
| 71 | 60 | 1.5 | $Na_2SiO_3$ | 5 | 2961 | 4131 | 17.6 | 3.5 | 0.12 |
| 72 | 80 | 1.0 | $Na_2SiO_3$ | 5 | 2732 | 3152 | 60.0 | 13.0 | 0.92 |
| 73 | 100 | 1.0 | $Na_2SiO_3$ | 5 | 3027 | 4127 | 42.1 | 8.3 | 0.44 |
| 74 | RT | 96 | NaOH | 2 | 2879 | 3455 | 4.4 | 0.6 | 0.00 |
| 75 | 40 | 24 | NaOH | 2 | 2870 | 4783 | 28.5 | 5.8 | 0.30 |
| 76 | 60 | 15 | NaOH | 2 | 2987 | 2987 | 29.2 | 6.1 | 0.30 |
| 77 | 80 | 4.0 | NaOH | 2 | 2915 | 3269 | 32.0 | 6.6 | 0.40 |
| 78 | 100 | 1.0 | NaOH | 2 | 3141 | 3732 | 39.5 | 6.6 | 0.50 |

Examples 79-84

Table 10 summarizes the effect of pH on aqueous titanation while using NaOH as the alkali metal source/precursor, and at a Ti loading of 2 wt. %. The pH was varied in the 4-10 range in the presence of sodium and ammonium hydroxide. Remarkably, all the titanated chromium/silica catalysts showed HLMI potential encompassing a commercially relevant range of 25-40, with mild titanium leaching noticed only at lower pH (e.g., pH range of 4-6). Leaching can be determined by ICP analysis of the filtrate, or addition of hydrogen peroxide to the filtrate, which results in a color change. The $H_2O_2$/Ti molar ratio was 12.3:1 and the Alkali/Ti molar ratio was 1.58:1. The Ti-source/precursor was $TiO_2$-OA.

For Examples 79-84, to 17 mL of water containing 2.5 g of 35 wt. % $H_2O_2$, 33 mL of 0.1N NaOH solution was added, and then 3.3 g of $TiO_2$-OA solution corresponding to 2 wt. % Ti. Then, ammonium hydroxide was added to increase the pH of the solution to 4 (for Example 84), 6 (for Example 83), 7 (for Example 82), 8 (for Example 81), 9 (for Example 80) and 10 (for Example 79). Next, 5 g preformed silica A was added and the mixture was heated to 100° C. under reflux for 3 days for Example 84, or 21 hr for Example 83, or 15 hr for Example 82, or 2 hr for Examples 80-81, or 1 hr for Example 79. Thus, for a pH range of 8-10, 1-2 hr may be sufficient, but at lower pH values in the 4-8 range, a longer time is needed. Note, unexpectedly, a neutral pH of 7 can be utilized, if desired.

The solids were filtered hot by suction filtration through a glass frit, washed with water and ethanol, and dried at RT. Then, 0.21 g CrOAc dissolved in 5 mL of methanol was added, RT dried, and activated in a flow of dry air in a fluidized bed at 650° C. for 3 hr.

TABLE 10

| Ex | pH | Ti wt % | Prod. (g/g) | Activity (g/g/h) | HLMI | $I_{10}$ | MI |
|---|---|---|---|---|---|---|---|
| 79 | 10 | 2 | 3141 | 3732 | 39.5 | 6.6 | 0.50 |
| 80 | 9 | 2 | 2983 | 2435 | 36.5 | 7.8 | 0.50 |

TABLE 10-continued

| Ex | pH | Ti wt % | Prod. (g/g) | Activity (g/g/h) | HLMI | $I_{10}$ | MI |
|---|---|---|---|---|---|---|---|
| 81 | 8 | 2 | 2928 | 3055 | 44.7 | 9.8 | 0.60 |
| 82 | 7 | 2 | 2956 | 3260 | 35.6 | 7.6 | 0.50 |
| 83 | 6 | 2 | 2896 | 3546 | 33.1 | 7.2 | 0.40 |
| 84 | 4 | 2 | 3315 | 6215 | 26.7 | 5.2 | 0.30 |

Examples 85-86

Table 11 demonstrates that chromium can be added along with the titanium, as opposed to loading chromium during the last stage of catalyst preparation, with the same beneficial improvement in polymer HLMI. In Examples 85-86, 0.20 g chromium (III) acetate hydroxide was dissolved in 20 mL water, then either 33 mL of 0.1N NaOH solution (for Example 85) or 0.29 g $NaHCO_3$ (for Example 86) was added. Then, 2.5 g of 35 wt. % $H_2O_2$ was added, followed by 3.3 g of $TiO_2$-OA solution corresponding to 2 wt. % Ti (for Example 85) or 2.2 g $TiOSO_4$ corresponding to 2 wt. % Ti (for Example 86), and the pH of the mixture was adjusted to 10 with addition of $NH_4OH$. After stirring for few min, 5 g preformed silica A was added and heated to 100° C. under reflux for 1 hr. The catalyst was then filtered, washed with water and ethanol. The dried catalyst was activated at 650° C. for 3 hr in dry air in a fluidized bed.

TABLE 11

| Ex | $H_2O_2$/Ti | Na/Ti | Ti wt % | Prod. (g/g) | Activity (g/g/h) | HLMI | $I_{10}$ | MI |
|---|---|---|---|---|---|---|---|---|
| 85 | 12.3 | 1.58 | 2 | 2905 | 3384 | 35.5 | 7.4 | 0.40 |
| 86 | 12.3 | 1.65 | 2 | 2889 | 3502 | 46.8 | 9.9 | 0.60 |

Examples 87-88

In Examples 87-88, 1 g $Na_2SiO_3$ was added to a solution containing 10 mL water, 16.6 g of 35 wt. % $H_2O_2$, and 5 g of ammonium hydroxide. After stirring for few min, a $TiO_2$-OA solution was added, followed by 5 g of a 0.5 wt. % chromium/silica catalyst, and if needed, the pH was readjusted to 10 and the mixture was heated to 100° C. under reflux for 1 hr. The amounts of $Na_2SiO_3$, $H_2O_2$ and $SiO_2$ in grams are shown in Table 12. The solids were filtered hot by suction filtration through a glass frit, washed with water and ethanol, and dried at RT, then activated in a flow of dry air in a fluidized bed at 650° C. for 3 hr. The polymerization experiment using the catalyst of Example 87 revealed a lower HLMI potential (~20 HLMI) compared to titanated chromium/silica catalysts prepared with a silica starting material (see Example 18 in Table 12) under similar conditions. While not wishing to be bound by theory, it is believed that the lower HLMI potential of Example 87 may be attributed to various factors including lower pore volume of the support and lower chromium loading (0.5 wt. %). Titanation without sodium silicate (Examples 88) using the 0.5 wt. % chromium/silica catalyst had only a HLMI potential of 11.5, again signifying the important role of the alkali metal for effective titanation.

TABLE 12

| Ex | gNa$_2$SiO$_3$/gH$_2$O$_2$/ gSiO$_2$ | Ti wt % | H$_2$O$_2$/ Ti | Alkali/ Ti | Prod. (g/g) | Activity (g/g/h) | HLMI | I$_{10}$ | MI |
|---|---|---|---|---|---|---|---|---|---|
| 18 | 1/16.6/5 | 5 | 32.7 | 0.59 | 2948 | 3845 | 44.4 | 9.00 | 0.51 |
| 87 | 1/16.6/5 | 5 | 32.7 | 0.59 | 2933 | 2514 | 20.1 | 3.73 | 0.16 |
| 88 | 0/16.6/5 | 5 | 32.7 | 0 | 2473 | 2433 | 11.5 | 2.08 | 0.1 |

Examples 89-107

With the exception of zinc, Table 13 demonstrates that divalent and trivalent metal ions during aqueous titanation do not provide the same benefit as alkali metals, which can form titanated chromium/silica catalysts with HLMI potentials of ~30-50. Divalent metal cations including Mg (Example 89), Ba (Examples 90-92), Sr (Examples 93-97), and Zn (Examples 98-102, 107A-107B), and trivalent metal cations including B (Examples 103-105) and Al (Example 106) were tested. The hydroxides of Ba and Sr were sparingly soluble. MgSO$_4$, Zn(NO$_3$)$_2$, H$_3$BO$_3$, and AlCl$_3$ were respectively used as Mg, Zn, B and Al sources (see Table 13). The Ti loading in these examples was 2 wt. % and the H$_2$O$_2$/Ti molar ratio was 12.3:1. The resulting titanated chromium/silica catalysts, though active, showed generally poor HLMI potential, mostly in the range of 10-15. The exception was zinc examples 107A-107B (HLMI values of ~30), where in addition to adding ammonium hydroxide to increase the pH to ~10, 0.5 g ammonium sulfate also was added.

TABLE 13

| Ex | Alkali Source | pH | M$^{n+}$/Ti | Prod. (g/g) | Activity (g/g/h) | HLMI | I$_{10}$ | MI |
|---|---|---|---|---|---|---|---|---|
| 89 | MgSO$_4$ | 8 | 1.67 | 2967 | 2212 | 14.9 | 2.9 | 0.10 |
| 90 | Ba(OH)$_2$ | 10 | 0.32 | 2917 | 2941 | 11.3 | 2.1 | 0.08 |
| 91 | | 10 | 0.63 | 3053 | 2220 | 10.3 | 1.9 | 0.07 |
| 92 | | 10 | 1.26 | 2993 | 1910 | 7.6 | 1.4 | 0.03 |
| 93 | Sr(OH)$_2$ | 10 | 0.18 | 2929 | 2407 | 12.2 | 2.3 | 0.10 |
| 94 | | 10 | 0.36 | 2957 | 2289 | 12.0 | 2.3 | 0.10 |
| 95 | | 10 | 0.64 | 2864 | 3014 | 15.0 | 3.0 | 0.10 |
| 96 | | 10 | 0.83 | 2929 | 2476 | 11.9 | 2.3 | 0.10 |
| 97 | | 10 | 1.00 | 2978 | 2305 | 15.6 | 3.0 | 0.20 |
| 98 | Zn(NO$_3$)$_2$ | 10 | 0.32 | 2980 | 2194 | 13.9 | 2.7 | 0.10 |
| 99 | | 10 | 0.80 | 3016 | 2276 | 20.9 | 4.0 | 0.20 |
| 100 | | 10 | 1.61 | 2879 | 1754 | 17.4 | 3.5 | 0.20 |

TABLE 13-continued

| Ex | Alkali Source | pH | M$^{n+}$/Ti | Prod. (g/g) | Activity (g/g/h) | HLMI | I$_{10}$ | MI |
|---|---|---|---|---|---|---|---|---|
| 101 | | 10 | 2.41 | 2967 | 2107 | 17.5 | 3.5 | 0.20 |
| 102 | | 10 | 4.02 | 3051 | 1979 | 16.9 | 3.3 | 0.10 |
| 103 | H$_3$BO$_3$ | 10 | 0.77 | 2953 | 3730 | 7.9 | 1.3 | 0.03 |
| 104 | | 10 | 1.63 | 3011 | 3441 | 9.0 | 1.6 | 0.06 |
| 105 | | 10 | 3.33 | 2950 | 3133 | 8.8 | 1.6 | 0.05 |
| 106 | AlCl$_3$ | 7 | 0.81 | 3081 | 5688 | 14.5 | 2.5 | 0.10 |
| 107A | Zn(NO$_3$)$_2$ | 9.4 | 0.53 | 3172 | 3403 | 31.2 | 6.4 | 0.32 |
| 107B | | 10 | 0.53 | 3199 | 4411 | 28.9 | 5.6 | 0.27 |

Examples 108-122

The amount of sodium was varied in Examples 108-122. First, 25 of water, 1-4 g of H$_2$O$_2$ (30-35%) and 1-4 g TiOSO$_4$ solutions were mixed at the molar ratio of H$_2$O$_2$/Ti listed in Table 14. Then, sodium hydroxide or NaNO$_3$ or a combination of both were added as the sodium source to reach the listed Na/Ti ratio. Following that, an ammonium source (ammonium hydroxide or ammonium sulfate or ammonium carbonate) was added. Depending on the ammonium source and sodium source, the pH of the final mixture was in the range of 4-10.5. For Examples 114-116, a constant ratio of NH$_4^+$/Ti of 1.92 was maintained and no pH was measured, and for Example 121, the ammonium source was ammonium carbonate. Next, 5 g of preformed silica A was added to the above solution and refluxed at 100° C. for a period of 1 hr. The color of the slurry changed from yellow to colorless or to faint yellow. The support was filtered, washed with water and ethanol, and 5 mL of chromium (III) acetate in methanol (1 mg Cr/mL) was added and dried at room temperature. Activation was carried out at 650° C. for a period of 3 hr and the polymerization results are presented in Table 14. Unexpectedly, very high levels of sodium (Na/Ti) still resulted in high polymer HLMI values (see also Table 5 above).

TABLE 14

| Ex | pH | H$_2$O$_2$/Ti | Na/Ti | Ti wt % | Prod. (g/g) | Activity (g/g/h) | HLMI | I$_{10}$ | MI |
|---|---|---|---|---|---|---|---|---|---|
| 108 | 10 | 9.4 | 0.13 | 3.5 | 3025 | 3525 | 23.2 | 4.7 | 0.25 |
| 109 | 10 | 9.4 | 0.26 | 3.5 | 3011 | 3409 | 35.5 | 7.5 | 0.41 |
| 110 | 10 | 9.4 | 0.55 | 3.5 | 2964 | 3066 | 45.6 | 9.7 | 0.61 |
| 111 | 10 | 9.4 | 0.93 | 3.5 | 2874 | 3135 | 61.9 | 13.1 | 0.86 |

TABLE 14-continued

| 112 | 10 | 9.4 | 1.60 | 3.5 | 2989 | 3736 | 84.0 | 17.8 | 1.26 |
|---|---|---|---|---|---|---|---|---|---|
| 113 | 10 | 9.4 | 6.85 | 3.5 | 2904 | 1834 | 52.3 | 11.6 | 0.83 |
| 114 |  | 12.36 | 3.36 | 2 | 2979 | 3136 | 11.3 | 2.2 | 0.10 |
| 115 |  | 12.36 | 4.80 | 2 | 3034 | 3166 | 24.3 | 5.0 | 0.25 |
| 116 |  | 12.36 | 5.76 | 2 | 2861 | 2470 | 49.5 | 10.6 | 0.70 |
| 117 | 10 | 9.4 | 2.88 | 3.5 | 3035 | 2529 | 53.5 | 11.7 | 0.81 |
| 118 | 10 | 9.4 | 2.84 | 3.5 | 2937 | 3422 | 68.3 | 14.1 | 1.07 |
| 119 | 10.5 | 6.7 | 30.1 | 3.23 | 3221 | 5204 | 26.8 | 5.4 | 0.28 |
| 120 | 8.7 | 6.9 | 10.66 | 3.14 | 3166 | 4166 | 49.8 | 10.7 | 0.64 |
| 121 | 7.1 | 6.9 | 21.5 | 3.14 | 3205 | 2987 | 50.9 | 10.9 | 0.73 |
| 122 | 6.7 | 5.1 | 26.1 | 1 | 3120 | 3132 | 32.3 | 6.7 | 0.41 |

| Ex | Activated Catalyst (wt. %) | | |
|---|---|---|---|
|  | Ti | Na | Cr |
| 114 | 2.1 | 0.16 | 0.99 |
| 115 | 2.4 | 0.15 | 0.84 |
| 116 | 2.6 | 0.40 | 1.02 |
| 117 | 3.8 | 1.06 | 1.03 |
| 118 | 3.7 | 1.05 | 0.86 |
| 119 | 2.9 | 0.31 | 0.99 |
| 120 | 3.7 | 0.14 | 0.97 |
| 121 | 2.7 | 1.05 | 0.87 |
| 122 | 1.0 | 0.89 | 1.16 |

Examples 123-130

Examples 123-130 were performed without ammonium hydroxide and are summarized in Table 15. Sodium silicate was mixed with 40 g water and 2-4 g $H_2O_2$ (30-35%), then 2-4 g $TiOSO_4$ solution was added, except for Example 126, which used potassium titanium oxalate as the titanium source and the pH was adjusted to 6.7 with dilute HCl before silica addition. For Examples 123-127, the sodium source was a mixture of sodium silicate and NaOH, while for Examples 128-130, the sodium source was a mixture of NaOH and $NaNO_3$. Next, 5 g of preformed silica A was added to the above solution and refluxed at 100° C. for a period of 1-3 hr. The yellow color of the slurry remained the same throughout the preparation. The support was filtered, washed multiple times with water and chromium (III) acetate in methanol was added and dried at room temperature. For Example 127, the filtered support was redispersed in 500 mL deionized water, and the pH was adjusted with acid (nitric or acetic) to remove excess sodium. Activation was carried out at 650° C. for a period of 3 hr and the polymerization results are presented in Table 15. Unexpectedly, ammonium hydroxide was not required to achieve very high polymer HLMI values.

TABLE 15

| Ex | pH | $H_2O_2/Ti$ | Na/Ti | Ti wt % | Prod. (g/g) | Activity (g/g/h) | HLMI | $I_{10}$ | MI |
|---|---|---|---|---|---|---|---|---|---|
| 123 | 4.9 | 12.36 | 8.0 | 2 | 2996 | 1965 | 25.3 | 5.2 | 0.30 |
| 124 | 4.5 | 10.97 | 7.9 | 3.6 | 3005 | 2134 | 30.8 | 6.6 | 0.40 |
| 125 | 4.9 | 10.97 | 8.3 | 3.6 | 2798 | 1519 | 27.5 | 5.7 | 0.34 |
| 126 | 6.7 | 7.05 | 4.6 | 3.6 | 3050 | 3327 | 25.3 | 5.2 | 0.25 |
| 127 |  | 5.92 | 9.0 | 3.5 | 2931 | 3642 | 28.8 | 5.5 | 0.25 |
| 128 | 4.5 | 10.87 | 25.2 | 2 | 3224 | 3504 | 41.8 | 9.3 | 0.60 |
| 129 | ~7 | 6.9 | 29.9 | 3.14 | 3178 | 2498 | 36.5 | 7.9 | 0.50 |
| 130 | 8.6 | 6.9 | 15.8 | 3.14 | 2929 | 3265 | 22.8 | 4.6 | 0.23 |

| Ex | Activated Catalyst (wt. %) | | |
|---|---|---|---|
|  | Ti | Na | Cr |
| 123 | 2.15 | 0.65 | 0.86 |
| 124 | 3.49 | 0.74 | 1.02 |
| 125 | 1.61 | 0.93 | 0.80 |
| 126 | 3.33 | 0.93 | 0.92 |
| 127 | 2.5 | 0.42 | 1.06 |
| 128 |  |  |  |
| 129 | 1.4 | 1.3 | 1.1 |
| 130 | 2.1 | 1.3 | 1.0 |

Examples 131-143

Examples 131-143 were performed with sodium hydroxide and various organic acids and bases (e.g., amines, organic tert-ammonium hydroxide, amino acids, glycols, hydroxy acids). The pH of the mixture was adjusted with either organic acids or bases or sodium hydroxide. Example 131 was prepared in the absence of organic acids or bases by mixing 50 g $H_2O$, 2.2 g $H_2O_2$ and 3.5 g $TiOSO_4$, then adding NaOH to increase the pH ~8.8. Next, 5 g preformed silica A was added and refluxed at 100° C. for 1 hr. The mixture was filtered hot, washed with ~500 mL water and ~20 mL ethanol and dried at room temperature. It was then dispersed in ~800 mL water and the pH of the solution (typically in alkaline region ~9) was adjusted to ~4 with dilute $HNO_3$ or acetic acid and stirred at room temperature for ~1 hr. It was then filtered again with ~2 L of water and ~20 mL ethanol and dried at room temperature. Next, 5 mL CrOAc/MeOH solution was added (incipient wetness impregnation), followed by drying at room temperature and activating at 650° C. for 3 hr. This procedure was repeated by adding organic acids or bases at the organic/titanium molar ratio shown in Table 16, and the organic was tetraethylammonium hydroxide for Example 132, diethylamine for Example 133, ethanolamine for Example 134, triethanolamine for Example 135, ethylamine for Example 136, N-methyldiethanol amine for Example 137, acetamide for Example 138, glycolic acid for Example 139, glycine for Example 140, ethylene carbonate for Example 141, DMF for Example 142, oxalic acid for Example 143, before adjusting pH with NaOH represented in the form of the Na/Ti molar ratios presented in Table 16. Beneficially, these examples demonstrate that various sources of nitrogen can be utilized and very high polymer HLMI values can be obtained.

Note that for Examples 131 and 141-143, sodium was further removed from the filtered support or after the heating step by dispersing the support in a solution of dilute nitric acid at a pH of ~3-4 and stirring for 30-60 min. For Examples 138-139, sodium was further removed from the filtered support or after the heating step by dispersing the support in acetic acid at a pH of ~3-4 and stirring for 30-60 min.

Examples 144-157

Examples 144-157 were performed with various inorganic ammonium salts such as $NH_4Cl$, $(NH_4)_2SO_4$, and $(NH_4)_2CO_3$, as summarized in Table 17. First, 20 g $H_2O$ was mixed with $H_2O_2$ and different Ti sources (titanium isopropoxide for Example 147, potassium titanyl oxalate for Example 148, ammonium titanyl oxalate for Example 149, the other examples used $TiOSO_4$), followed by addition of NaOH and ammonium salts to adjust the pH to the value listed in Table 17. Then, 5 g of preformed silica A was added and refluxed at 100° C. for 1 hr. The support was filtered, washed multiple times with water and chromium (III) acetate in methanol was added and dried at room temperature. For Examples 150-154, sodium was further removed from the filtered support or after the heating step by dispersing the support in a solution of dilute acid (nitric or acetic) at a pH of ~3-4 and stirring for 30-60 min. Activation was carried out at 650° C. for a period of 3 hr and the polymerization results are listed in Table 17. Interestingly, in the absence of either sodium salts (Example 157) or ammonium salts (Example 151), the HLMI potential of the catalyst was below 6. Manipulating the concentration of both the ammonium salts and sodium salts yielded catalysts with very high HLMI potential (HLMI values of 30-50).

TABLE 16

| Ex | pH | Org/Ti | Na/Ti | Ti wt % | Prod. (g/g) | Activity (g/g/h) | HLMI | $I_{10}$ | MI |
|---|---|---|---|---|---|---|---|---|---|
| 131 | 8.8 | 0 | 8.88 | 3.5 | 3153 | 3141 | 4.1 | 0.6 | 0 |
| 132 | 9.7 | 7.7 | 1.70 | 2 | 3014 | 3690 | 37.4 | 8 | 0.48 |
| 133 | 10 | 9.1 | 1.92 | 3.5 | 3185 | 4662 | 49.1 | 10.9 | 0.65 |
| 134 | 9.3 | 9.8 | 1.92 | 3.5 | 3134 | 4688 | 46.4 | 9.8 | 0.59 |
| 135 | | 13.4 | 2.03 | 3.5 | 3247 | 4383 | 41.4 | 8.6 | 0.51 |
| 136 | 10.2 | 9.5 | 1.92 | 3.5 | 3000 | 4435 | 45.2 | 9.5 | 0.56 |
| 137 | 8.3 | 10.7 | 1.64 | 3.5 | 3141 | 5393 | 25.7 | 4.8 | 0.22 |
| 138 | 8.3 | 1.37 | 2.63 | 3.5 | 3242 | 4615 | 20.6 | 4.0 | 0.16 |
| 139 | 8.0 | 2.72 | 5.21 | 3.5 | 3235 | 5212 | 37.2 | 7.6 | 0.41 |
| 140 | 8.4 | 3.06 | 8.39 | 3.5 | 3053 | 2521 | 32.1 | 7.1 | 0.45 |
| 141 | 8.9 | 3.07 | 8.80 | 3.5 | 3328 | 2877 | 29.3 | 5.9 | 0.34 |
| 142 | 8.3 | 3.7 | 8.52 | 3.5 | 3137 | 3941 | 22.4 | 4.4 | 0.19 |
| 143 | 8.2 | 2.28 | 13.35 | 3.5 | 3190 | 3014 | 29.4 | 6.1 | 0.32 |

| Ex | Activated Catalyst (wt. %) | | |
|---|---|---|---|
| | Ti | Na | Cr |
| 131 | 2.96 | 0.03 | 1.14 |
| 132 | 2.16 | 0.51 | 1.07 |
| 133 | 2.89 | 0.41 | 0.97 |
| 134 | 3.71 | 0.25 | 1.02 |
| 135 | 4.01 | 0.09 | 1.04 |
| 136 | 3.52 | 0.38 | 1.04 |
| 137 | 3.56 | 0.03 | 1.04 |
| 138 | | | |
| 139 | 2.01 | 0.25 | 1.07 |
| 140 | 2.47 | 1.38 | 1.19 |
| 141 | 2.41 | 0.65 | 1.23 |
| 142 | 3.99 | 0.33 | 1.12 |
| 143 | 3.58 | 0.51 | 1.00 |

TABLE 17

| Ex | pH | (NH$_4$)$^+$ source | (NH$_4$)$^+$/Ti | Na/Ti | Ti wt % | Prod. (g/g) | Activity (g/g/h) | HLMI | I$_{10}$ | MI |
|---|---|---|---|---|---|---|---|---|---|---|
| 144 | 8.8 | NH$_4$Cl | 4.8 | 12.01 | 2.0 | 3101 | 2311 | 32.0 | 6.8 | 0.41 |
| 145 | 9.0 | (NH$_4$)$_2$SO$_4$ | 19.2 | 12.01 | 2.0 | 3035 | 2093 | 41.0 | 8.8 | 0.54 |
| 146A | 8.4 | (NH$_4$)$_2$SO$_4$ | 4.8 | 9.6 | 2.0 | 3054 | 1600 | 31.5 | 6.9 | 0.44 |
| 146B | 9.1 | (NH$_4$)$_2$SO$_4$ | 4.93 | 9.89 | 3.5 | 3123 | 1874 | 29.1 | 6.4 | 0.42 |
| 147 | 9.1 | (NH$_4$)$_2$SO$_4$ | 10.96 | 2.88 | 3.5 | 3060 | 3060 | 50.6 | 10.8 | 0.73 |
| 148 | 8.9 | (NH$_4$)$_2$SO$_4$ | 10.96 | 4.82 | 3.5 | 3142 | 1953 | 48.8 | 10.7 | 0.73 |
| 149 | 7.8 | (NH$_4$)$_2$SO$_4$ | 4.8 | 3.22 | 2.0 | 3004 | 4344 | 41.9 | 9.0 | 0.59 |
| 150 | 9.3 | (NH$_4$)$_2$SO$_4$ | 5.48 | 10.66 | 3.14 | 3026 | 3830 | 20.6 | 3.9 | 0.20 |
| 151 | 8.8 | None | 0 | 9.87 | 3.14 | 3153 | 3141 | 4.1 | 0.6 | — |
| 152 | 4.5 | (NH$_4$)$_2$SO$_4$ | 4.87 | 8.29 | 3.14 | 3117 | 3620 | 16.3 | 3.1 | 0.13 |
| 153 | 8.7 | (NH$_4$)$_2$SO$_4$ | 19.50 | 10.66 | 3.14 | 3166 | 4166 | 49.8 | 10.7 | 0.64 |
| 154 | 8.3 | (NH$_4$)$_2$SO$_4$ | 85.3 | 10.36 | 3.14 | 3224 | 4390 | 22.5 | 4.4 | 0.22 |
| 155 | ~9 | (NH$_4$)$_2$SO$_3$ | 12.18 | 1.07 | 2.0 | 3118 | 4006 | 27.8 | 5.8 | 0.31 |
| 156 | 8.5 | (NH$_4$)$_2$SO$_3$ | 24.37 | 1.83 | 3.14 | 3227 | 4314 | 38.0 | 8.1 | 0.47 |
| 157 | 4.1 | (NH$_4$)$_2$SO$_3$ | 8.53 | 0 | 3.14 | 3143 | 2979 | 3.0 | 0.3 | — |

| Activated Catalyst (wt. %) | | | |
|---|---|---|---|
| Ex | Ti | Na | Cr |
| 144 | 2.35 | 0.58 | 0.98 |
| 150 | 4.06 | 0.03 | 0.93 |
| 151 | 2.96 | 0.03 | 1.14 |
| 152 | | | |
| 153 | 3.67 | 0.14 | 0.98 |
| 154 | 3.66 | 0.04 | 0.87 |
| 155 | 2.19 | 0.08 | 0.89 |
| 156 | 3.19 | 0.11 | 0.87 |

Examples 158-195

The titanated supports of Examples 158-195 were prepared using a wide variety of reaction times, temperatures, concentrations, pH values, and ingredients for the aqueous deposition of titanium onto silica. As compared to previous examples, many of Examples 158-195 were performed without a nitrogen-containing compound and at a lower pH. Table 18 summarizes the results of Examples 158-195 and ICP analysis of certain pre-catalysts and (activated) catalysts (in wt. %).

Example 158: To 50 mL of deionized water was added 25.12 g of a 15% TiOSO$_4$ solution (which included sulfuric acid to maintain stability) for a target Ti loading of 5.0 wt. %. Next, 11.0 g Na$_2$SO$_4$, and 66 mL of an 8.17% solution of NaOH was added, yielding a total Na/Ti molar ratio of 13.16. Then 20.0 g of silica (500 m$^2$/g, 1.6 mL/g, avg size 100 μm) were added and the slurry, now with a pH of about 3, was heated to 75° C. and held at that temperature with stirring for 15 hr. To wash the sodium out, 4 L of water was added and the slurry was stirred for 1 hr. The solids were filtered out, and approximately 20 mL was added of a methanol solution of chromium (III) acetate containing 0.01 g Cr per mL. The pre-catalyst was dried in a vacuum oven at 100° C. for several hours and then pushed through a 35-mesh screen. Finally, a 10 g portion of this green powder was calcined in dry air at 650° C. for 3 hr.

Example 159: The process of Example 158 was repeated, except that no heat was applied, only stirring at 25° C. for 3 days. 100 mL of water was used, and 82 mL of a 2.26 N NaOH stock solution was added instead (7.39 NaOH/Ti, 14.83 total Na/Ti, and pH of ~4.5). Again, the Ti loading target was 5.0 wt. %.

Example 160: A process similar to Example 158 was used. 15.57 g of 15% TiOSO$_4$ solution was added (for a Ti target loading of 3.47 wt. %) to 100 mL of water. Also added was 21.14 g of the same silica used in Example 158, 10.11 g of a 30% H$_2$O$_2$ solution, and 11.14 g Na$_2$SO$_4$. This yielded a deep orange-red, almost black, solution, indicating a peroxo-Ti complex. The color lightened to orange-yellow when 39 mL of a 2.26 NaOH stock solution was added. Thus, the total Na/Ti molar ratio in the slurry was 16.7. The slurry, which had a pH of about 3.5, was then stirred for 15 hr at 25° C. At this point the yellow color had adsorbed onto the silica. When the stirrer was temporarily halted, the silica settled to the bottom of the beaker. It had a yellow color, and the solution above was clear and colorless, which shows that the peroxo-Ti complex had adsorbed from the water solution onto the silica. At this point the pH was about 2.5. The slurry was then stirred and heated to 85° C. for 2 hr. Afterward it was diluted with 4 L of additional water to wash sodium out. After 30 min of stirring, the slurry was filtered, leaving yellow solids on the filter, and a clear solution that went through the filter. This colorless solution was then acidified by adding 3 mL of concentrated H$_2$SO$_4$ to it, bringing the pH to about 1, and 5 mL of 30% H$_2$O$_2$ was added. This combination (acid and H$_2$O$_2$) would have given a deep orange color had any titanium passed through the filter. But instead, no change in color was observed. The solution was still colorless, proving that all of the Ti had indeed adsorbed onto the silica. Finally, the filter cake was impregnated with Cr, dried, screened, and calcined as indicated above in Example 158.

Example 161: A procedure similar to that in Example 158 was again used. Into 199 mL of water was added 16.06 g of 15% TiOSO$_4$ solution, 7.76 g of arginine alpha-ketoglutarate (AKG), and 5 mL of 30% H$_2$O$_2$. After dissolution, 9.21 g of Na$_2$CO$_3$ was added to raise the pH to about 9.5, and 20.2 g was added of the same silica used above in Example 158. The mixture was heated with stirring at 90° C. for 7 hr. It was then allowed to stir for 3 days at room temperature. At first, during the heat treatment, the yellow color adsorbed onto the silica, as described in Example 160. When the stirring was temporarily stopped, the yellow silica settled to the bottom leaving a clear colorless solution above. After 7 hours of stirring at 90° C., however, the yellow color had disappeared, indicating that the $H_2O_2$ had decomposed in contact with the AKG. The support was then filtered and the liquid passing through the filter was tested for the presence of Ti, as indicated above with additional $H_2O_2$ and $H_2SO_4$. No color developed in the solution, indicating that no trace of Ti was found in the liquid, and therefore that all the Ti still remained adsorbed on the silica. The support was washed in 4 L of water which had been acidified to a pH ~4 with acetic acid, followed by another filtration. This was done to enhance sodium removal. After the second filtration, the semi-dry support was impregnated with Cr, dried, screened, and calcined, all as described in Example 158.

Example 162: To 200 mL of water was added 15.39 g of 15% $TiOSO_4$ solution and 5 mL of 30% $H_2O_2$, which made a deep orange solution. Sodium bicarbonate, 6.05 g, was added to bring the original pH ~2 up to pH ~4, and the orange solution turned to yellow. The same silica used above, 20.8 g, was then added, along with 4 mL of ethylamine, and the slurry was heated to 92° C. for 4 hr. The pH after heating was about 6.5. The slurry was filtered, and the liquid was again tested for Ti as described above, but none was found. The solid support was washed and filtered two times using 1 L of acidified water, e.g. 2 mL of acetic acid had been added, to remove sodium. The final support was impregnated with Cr, dried, screened, and calcined exactly as described above in Example 158.

Example 163: A procedure similar to that in Example 158 was again used. Into 96.06 mL of water was added 1.1969 g of $TiOSO_4$ powder, along with 3.0 mL of 30% $H_2O_2$ and 2.01 g of $Na_2SO_4$ to make a deep orange solution. Then 6.5 mL of 2.26 N NaOH stock solution was added to bring the pH up to 3.6, yielding a total molar Na/Ti ratio of 5.9. 20.02 g of silica was added, the same silica used in the experiments above. After 1 hr of stirring at room temperature, the yellow color was totally adsorbed onto the silica, as was evident because the yellow color settled out with the silica when the stirring was temporarily stopped, leaving a colorless solution above the settled yellow solid. The slurry was then heated with stirring to 80-85° C. for 2 hr. The final pH was 6.0. The slurry was filtered leaving a yellow solid on the filter and the clear colorless liquid passing through the filter. This liquid was acidified with $H_2SO_4$ and 2 mL of 30% $H_2O_2$ added, but it still did not display any color, confirming that all of the Ti had indeed adsorbed quantitatively onto the silica. The solid was then impregnated with Cr, dried, screened and calcined as described in Example 158.

Example 164: The procedure described in Example 163 was repeated, but with these changes: 105 mL water, 1.52 g $Na_2SO_4$ and 9.7 mL of NaOH solution, yielding a total Na/Ti molar ratio of 8.9 and a pH of 7.7 (8.3 after heating). The slurry was heated at 80° C. for 4 hr. Again, the yellow color from the peroxo-Ti complex completely adsorbed onto the silica, as indicated by settling, and later by testing the filtered colorless water with $H_2SO_4$ and $H_2O_2$.

Example 165: The procedure described in Example 163 was repeated, but with these changes: No NaOH, 2.98 g $Na_2SO_4$, pH 1.9, molar Na/Ti 5.6.

Example 166: Into 96.6 mL of deionized water was added 1.17 g of $TiOSO_4$ powder, 3.03 g $Na_2SO_4$, 3 mL of 35% $H_2O_2$, and 8.51 mL of 1.37 N $NH_4OH$ solution. This produced a yellow solution of pH 3.5. 20.1 g of silica (same grade as above) was added, and the yellow color adsorbed onto silica with a few minutes of stirring at 25° C. The slurry was allowed to stir for 3 days at 25° C. then filtered producing a yellow solid on the filter and a clear colorless liquid passing through the filter. The liquid was tested for Ti in the usual manner, but no Ti was detected, indicating that all of it had adsorbed onto the silica. The solid was washed in 2 L of water, which was stirred for 30 min, producing a pH of 5. The solid was filtered out again, and then finished as described above, that is, Cr impregnation, drying, screening, and calcination.

Example 167: Into 98.8 mL of deionized water was added 1.167 g of $TiOSO_4$ powder, 3 mL of 35% $H_2O_2$, and 8 mL of 1.37 N $NH_4OH$ solution. This produced a yellow solution of pH 3.7. 20.0 g of silica (same grade as above) was added, and the yellow color adsorbed onto silica with a few min of stirring at 25° C. The slurry was allowed to stir for 2 hr at 98° C., then filtered producing a yellow solid on the filter and a clear colorless liquid passing through the filter. The liquid was tested for Ti in the usual manner, but no Ti was detected, indicating that all of it had adsorbed onto the silica. The solid was washed in 2 L of water, which was stirred for 1 hr. The solid was filtered out again, and then finished as described above, that is, Cr impregnation, drying, screening, and calcination.

Example 168: Into 87.35 mL of deionized water was added 1.20 g of $TiOSO_4$ powder, 3 mL of 35% $H_2O_2$, and 10 mL of $Mg(OH)_2$ slurry (1.33 M). This produced a clear yellow solution of pH 4.1. 20.0 g of silica (same grade as above) was added, and after being stirred for 2 hr at 25° C., the yellow color adsorbed onto silica. That is, the yellow color settled out with the silica when the stirring was stopped, leaving a clear liquid above. The slurry was allowed to stir for 15 hr at 25° C., then it was filtered producing a yellow solid on the filter and a clear colorless liquid passing through the filter. The liquid was tested for Ti in the usual manner, but no Ti was detected, indicating that all of it had adsorbed onto the silica. The solid was washed in 2 L of water, which was stirred for 1 hr giving a pH of about 5. The solid was filtered out again, and then finished as described above, that is, Cr impregnation, drying, screening, and calcination.

Example 169: Into 108.5 mL of deionized water was added 15.6 g of 15% $TiOSO_4$ solution, 3 mL of 35% $H_2O_2$, 13.83 g $Na_2SO_4$, 20.25 g of $MgSO_4$, and 50.0 mL of 2.26 N NaOH solution. This produced a clear yellow solution of pH 4.3. This resulted in a Na/Ti molar ratio of 21.3 and a Mg/Ti molar ratio of 11.5. Then 20.1 g of silica (same grade as above) was added, and the slurry was heated to 92° C. for 45 min. Upon settling, the yellow color adsorbed onto silica, leaving a clear colorless liquid above of pH 6.2. The slurry was filtered producing a yellow solid on the filter and a clear colorless liquid passing through the filter. The liquid was tested for Ti in the usual manner, but no Ti was detected, indicating that all of it had adsorbed onto the silica. 2 L of water, to which 5 mL of acetic acid had been added to reach pH 3.7, was then added and the slurry stirred for 30 min to remove sodium. The solid was filtered out again, and then finished as described above, that is, Cr impregnation, drying, screening, and calcination.

Example 170: Into 92.3 mL of deionized water was added 15.43 g of 15% $TiOSO_4$ solution, 3 mL of 35% $H_2O_2$, 14.8 g of $MgSO_4$, and 30.32 mL of 1.33 M $Mg(OH)_2$ slurry. This produced a clear yellow solution of pH 4.2 and having a Mg/Ti molar ratio of 11.2. Then 20.1 g of silica (same grade as above) was added, and the slurry was heated to 80° C. for 5 hr. Upon settling, the yellow color adsorbed onto silica, leaving a clear colorless liquid above of pH 5.8. The slurry was filtered producing a yellow solid on the filter and a clear colorless liquid passing through the filter. The liquid was tested for Ti in the usual manner, but no Ti was detected, indicating that all of it had adsorbed onto the silica. The solid was washed and filtered twice in 2 L of water, to which 3 mL of acetic acid had been added to reach pH 3.8. In each wash the slurry was stirred for 30 min to remove metal ions. The solid was then finished as described above, that is, Cr impregnation, drying, screening, and calcination.

Example 171: The procedure described in Example 164 was repeated, but with these changes: 100 mL water, 1.237 g $TiOSO_4$ powder, 8.56 g $Na_2SO_4$ and 9.7 mL of NaOH solution, yielding a total Na/Ti molar ratio of 9.8. The slurry was heated at 93° C. for 2.5 hr. The yellow color from the peroxo-Ti complex completely adsorbed onto the silica, as indicated by settling, and later by testing the filtered color-less water with $H_2SO_4$ and $H_2O_2$. The slurry was filtered, leaving a yellow solid on the filter while a colorless clear liquid went through the filter. This liquid was acidified with 2 mL concentrated $H_2SO_4$ and then 2 mL $H_2O_2$. This produced no color, indicating that all of the Ti had adsorbed onto the silica. The solid was washed in 2 L of water, then finished as indicated above, that is, Cr impregnation, drying, screening, and calcining at 650° C.

Example 172: In this preparation 2.417 g of $TiOSO_4$ powder was dissolved in 229.3 mL of de-ionized water, as well as 6 mL of 35% $H_2O_2$, 6.5 mL of 2.26 N NaOH stock solution, and 4.045 g of $Na_2SO_4$. This resulted in a 4.9 Na/Ti molar ratio. Silica, 40.0 g of the same grade used above, was then added and the mixture stirred for 4 hr. The yellow color was fully adsorbed onto the silica; when the stirring was temporarily halted, the yellow-colored silica quickly settled out leaving clear colorless solution above. This slurry was then split in half. The first half was filtered without washing and then dried in a vacuum oven at 100° C. overnight. The liquid that passed through the filter was acidified with $H_2SO_4$ and then 3 mL of $H_2O_2$ was added, as a test for Ti. There was no color change, indicating that all of the Ti had been adsorbed onto the silica. The dried silica was then washed in 2 L of water containing 3 mL of acetic acid so that the pH was about 3.5. After 30 min of stirring at 25° C., the silica was again filtered out, and finished as described in Example 158, that is, impregnated with Cr, dried, screened, and calcined at 650° C. The purpose of the additional drying step was to determine the impact of a hydrothermal treat-ment in the presence of sodium.

Example 173: In this preparation the other half of the slurry made in Example 172 was heated at 95° C. for 2.5 hr. Then it was filtered and washed with 2 L of water containing 3 mL acetic acid. It was finished in the manner of Example 158 (Cr, dry, screen, calcine).

Example 174: To test the effect of very high sodium levels, in this preparation 123.4 mL of water was weighed into a beaker, into which was added 15.63 g of 15% $TiOSO_4$, 3 mL of 35% $H_2O_2$, 30.66 g $Na_2SO_4$, and 50 mL of 2.26 N NaOH solution. This resulted in a Na/Ti molar ratio of 37.4. 20.0 g was added of the same silica as used above. As the NaOH was slowly added, the color of the solution changed from deep orange-red to a light yellow as the pH rose to 4.5. It was then heated at 93° C. for 1.5 hr, resulting in a pH of 6.3. The support was washed in 1 L of water, then filtered and finished in the same manner as Example 158.

Example 175: To determine the impact of heat treatment, in this preparation 129.9 mL of water was weighed into a beaker, into which was added 17.31 g of 15% $TiOSO_4$, 3 mL of 35% $H_2O_2$, 30.76 g $Na_2SO_4$, and 54.5 mL of 2.26 N NaOH solution. This resulted in a Na/Ti molar ratio of 36.5. 20.9 g was added of the same silica as used above. As the NaOH was slowly added, the color of the solution changed from deep orange-red to a light yellow as the pH rose to 4.5. It was then stirred at 25° C. for 15 hr. Afterward, 2 L of water was added, producing a pH of 5.5, and the support was stirred for 30 min to wash out sodium ions. Then it was filtered and finished in the same manner as Example 158.

Example 176: Once adsorbed onto the silica, the $H_2O_2$ chelated to the Ti can be reduced by the addition of reducing agents, to determine if this enhances the deposition and attachment of Ti onto the silica surface. Thus, in this experiment, 125 mL of water was poured into a beaker, followed by 16.59 g of 15% $TiOSO_4$ solution, 3 mL 35% $H_2O_2$ solution, 29.76 g $Na_2SO_4$, 20.0 g of silica (described above) and 53 mL of 2.26 N NaOH stock solution. The slurry was stirred for 30 min to allow the peroxo-Ti complex to adsorb onto the silica. The final pH was 4.3. Next 9.46 g of $NaHSO_3$ was added. The pH dropped back to 2.9, which should bring back a deep orange color, but instead it turned the yellow very pale, almost white. Then the heat was turned on, and before the temperature could rise to 66° C., the yellow color had completely vanished. Nevertheless, heat-ing was continued to 90° C. where it remained for 1 hr. The support was then washed in 2 L of water, and finished in the same way as in Example 158 (Cr, dry, screen, calcine).

Example 177: In another experiment 61.5 g of 15% $TiOSO_4$ was added to 364.4 mL of water in a beaker, along with 12 mL of 35% $H_2O_2$ and 92.95 g of $Na_2SO_4$. Then 80.4 g of the same silica grade described above was added, followed by a slow addition of 194 mL of 2.26 N NaOH stock solution. The final mixture, which had a pH of 4.1 was stirred at 25° C. for 15 hr. The next day it was noticed that when the stirrer was temporarily turned off the yellow color settled out with the silica, indicating that the peroxo-Ti complex had been adsorbed. The slurry was then split into two parts. One part was then heated to 95° C. for 3 hr resulting in a pH of 5.7. Then this part was split into two parts again. To the first part was added 9.0 g of $(NH_4)_2SO_4$ and then the temperature was raised again to 95° C. for 2 hr. The color remained yellow. This was done to determine the impact of whether the $NH_4$ ion was present during the adsorption or could be added after adsorption to enhance the performance of the catalyst. This part of the slurry was then finished in the usual way. It was washed and filtered twice in 2 L of water. Each time the filter retained the yellow color, while a clear colorless solution pass through. When tested, this clear solution was not found to contain Ti. Next 20 mL of a chromium acetate in methanol solution (0.01 g Cr/mL) was added to the filtered solids, the mixture was dried in a vacuum oven at 100° C. for several hr, then it was pushed through a 35-mesh screen, followed by calcination in dry air at 650° C. for three hr.

Example 178: In the second part from Example 177, 4.43 g of $NaHSO_3$ was added to the slurry at 25° C. There was no color change within 30 min. Therefore, the slurry was heated to 85° C., and then it gradually changed color from yellow to white, indicating reduction of $H_2O_2$ ligands on the Ti. It was heated for 2 hr and the slurry was filtered and the clear liquid passing through the filter was again found to contain no Ti in the standard test. The filtered solids were stirred into 2 L of water for 30 min at pH 5.2. The solids were washed and filtered a second time in 2 L of water. Next 20 mL of a chromium acetate in methanol solution (0.01 g Cr/mL) was added to the filtered solids, the mixture was dried in a vacuum oven at 100° C. for several hr, then it was pushed through a 35-mesh screen, followed by calcination in dry air at 650° C. for three hr.

Example 179: The second half described in Example 177, 11.47 g of $Na_2CO_3$ was added to test the effect of pH, which rose to 10.1. This half was also split into two equal parts. In the first part, the slurry was stirred at 25° C. for 30 min, and then washed in 2 L of water containing 3 mL of acetic acid (pH 5.3). After 30 min of stirring it was filtered, and then washed again in 1 L of water and filtered again. The solids on the filter were impregnated with 20 mL of 0.01 g/mL methanolic chromium (III) acetate solution, dried in a vacuum oven at 100° C. overnight, then pushed through a 35 mesh screen, and finally calcined for 3 hr in dry air at 650° C.

Example 180: In the second part from Example 179, which is the second half from Example 177, the slurry was heated to 87° C. for 2 hr. The yellow solids were then filtered, washed, and filtered again 2 times each in 2 L of water. Next 20 mL of a chromium acetate in methanol solution (0.01 g Cr/mL) was added to the filtered solids, the mixture was dried in a vacuum oven at 100° C. for several hr, then it was pushed through a 35-mesh screen, followed by calcination in dry air at 650° C. for three hr.

Example 181: This test was designed to adsorb Ti in the absence of sodium, but then to conduct the hydrothermal treatment in the presence of sodium. Thus, into 111.11 g of de-ionized water was dissolved 2.29 g of $TiOSO_4$ powder, 3 mL of 35% $H_2O_2$ solution, and 14.54 g of 1.37 N $NH_4OH$ stock solution. As the $NH_4OH$ was added the deep orange-red starting color faded to a lighter orange color, and the pH rose to 3.0. The silica, 20.2 g of the same grade used in Example 158, was added next. The slurry was stirred at 25° C. for 15 hr to allow for adsorption. After this treatment, the yellow color was adsorbed onto the silica. When the stirring was temporarily halted the yellow silica settled leaving a clear colorless solution above. At this point 30.2 g of $Na_2SO_4$ was added (28.0 Na/Ti molar ratio) and the temperature was raised to 85° C. for 4 hr. The silica was then filtered off, washed for 30 min in 2 L of water, filtered again, impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 182: This test was designed to reverse the process of Example 181. That is, Ti was adsorbed in the presence of sodium, but hydrothermally treated in the absence of sodium. Thus, into 116.09 g of de-ionized water was dissolved 2.34 g of $TiOSO_4$ powder, 3 mL of 35% $H_2O_2$ solution, 30.39 g of $Na_2SO_4$, and 12.6 mL of 2.26 N NaOH stock solution. As the NaOH was slowly added the deep orange-red color changed to a light yellow-orange color, and the pH rose to 4.2. Silica, 20.03 g of the same grade used in Example 158, was added. The slurry was stirred at 25° C. for 15 hr. After this treatment, the yellow color was adsorbed onto the silica. When the stirring was temporarily halted the yellow silica settled leaving a clear colorless solution above. At this point the yellow silica was filtered, and the clear colorless liquid passing through the filter was tested for the presence of any Ti. It was acidified by the addition of 3 mL concentrated $H_2SO_4$, then 5 mL 35% $H_2O_2$ solution was added, but there was no change to an orange color, indicating the absence of Ti in the solution. The yellow filtered silica was then washed in 2 L of water and filtered again two times. Then the yellow silica was slurried in 200 mL of de-ionized water and heated to 90° C. for 1.5 hr. It was subsequently filtered again, impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 183: This experiment was designed to test extremely high levels of sodium combined with low hydrothermal temperature. Therefore, into 95.36 g de-ionized water was dissolved 15.64 g of 15% $TiOSO_4$ solution, 30.49 g $NaNO_3$, 29.69 g $Na_2SO_4$, 3 mL 35% $H_2O_2$ solution, and 50 mL of 2.26 N NaOH stock solution. This resulted in a total Na/Ti molar ratio of 60.74. As the NaOH was slowly added the deep orange-red color changed to a light yellow-orange color, and the pH rose to 4.0. Silica, 20.8 g of the same grade used in Example 158, was added and the slurry was stirred at 56° C. for 15 hr. After this treatment, the yellow color was adsorbed onto the silica. The stirring was temporarily halted, and the yellow silica settled out leaving a clear colorless solution above. At this point the yellow silica was filtered, and the clear colorless liquid passing through the filter was tested for the presence of any Ti. It was acidified by the addition of 3 mL concentrated $H_2SO_4$, then 5 mL 35% $H_2O_2$ solution was added, but there was no change to an orange color, indicating the absence of Ti in the solution. The yellow filtered silica was then washed in 2 L of water and filtered again two times. Then the yellow silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 184: This experiment was designed to test extremely high levels of sodium combined with medium hydrothermal temperature. Therefore, into 96.68 g de-ionized water was dissolved 16.14 g of 15% $TiOSO_4$ solution, 62.09 g $NaNO_3$, 40.4 g $Na_2SO_4$, 3 mL 35% $H_2O_2$ solution, and 52 mL of 2.26 N NaOH stock solution. This resulted in a total Na/Ti molar ratio of 93.64. As the NaOH was slowly added the deep orange-red color changed to a light yellow-orange color, and the pH rose to 3.8. Silica, 20.4 g of the same grade used in Example 158, was added and the slurry was stirred at 70° C. for 5.5 hr. After this treatment, the yellow color was adsorbed onto the silica. The stirring was temporarily halted, and the yellow silica settled out leaving a clear colorless solution above. At this point the yellow silica was filtered, and the clear colorless liquid passing through the filter was tested for the presence of any Ti. It was acidified by the addition of 3 mL concentrated $H_2SO_4$, then 5 mL 35% $H_2O_2$ solution was added, but there was no change to an orange color, indicating the absence of Ti in the solution. The yellow filtered silica was then washed in 2 L of water and filtered again two times. Then the yellow silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 185: This experiment was designed to determine the impact or a different alkali metal ion, potassium. Therefore, into 98.9 g de-ionized water was dissolved 15.41 g of 15% $TiOSO_4$ solution, 50.9 g $KNO_3$, 3 mL 35% $H_2O_2$ solution, and 101.5 mL of 1.31 N KOH stock solution. This resulted in a total K/Ti molar ratio of 44.08. As the KOH was slowly added the deep orange-red color changed to a light yellow-orange color, and the pH rose to 3.5. Silica, 20.1 g of the same grade used in Example 158, was added and the slurry was stirred at 90° C. for 1.5 hr. After this treatment, the yellow color was adsorbed onto the silica. The stirring was temporarily halted, and the yellow silica settled out leaving a clear colorless solution above. At this point the yellow silica was filtered, and the clear colorless liquid passing through the filter was tested for the presence of any Ti. It was acidified by the addition of 3 mL concentrated $H_2SO_4$, then 5 mL 35% $H_2O_2$ solution was added, but there was no change to an orange color, indicating the absence of Ti in the solution. The yellow filtered silica was then washed in 2 L of water and filtered again two times. Then the yellow silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 186: This experiment was designed to determine the effect of Ti adsorption from a very dilute Ti solution. Therefore, into 624.61 g de-ionized water was dissolved 15.43 g of 15% $TiOSO_4$ solution, 3 mL 35% $H_2O_2$ solution, 179.94 g $Na_2SO_4$, and 35.1 mL of 2.80 N NaOH stock solution. This resulted in a total Na/Ti molar ratio of 177.6. Although high, this ratio produces the same molar Na concentration (6.5 M) that was used in Example 185 and earlier experiments. As the NaOH was slowly added the deep orange-red color changed to a light yellow-orange color, and the pH rose to 3.6. Silica, 20.5 g of the same grade used in Example 158, was added and the slurry was stirred at 83° C. for 2 hr. After this treatment, the yellow color was indeed adsorbed onto the silica. The stirring was temporarily halted and the yellow silica settled out leaving a clear colorless solution above. At this point the yellow silica was filtered, and the clear colorless liquid passing through the filter was tested for the presence of any Ti. It was acidified by the addition of 3 mL concentrated $H_2SO_4$, then 5 mL 35% $H_2O_2$ solution was added, but there was no change to an orange color, indicating the absence of Ti in the solution. The yellow filtered silica was then washed in 2 L of water and filtered again two times. Then the yellow silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 187: This experiment was designed to test the effect of Ti deposition from a high Ti concentration at low pH. Therefore, into 50.1 g de-ionized water was dissolved 15.43 g of 15% $TiOSO_4$ solution, 24.0 g $NaNO_3$, 3 mL 35% $H_2O_2$ solution. This resulted in a total Na/Ti molar ratio of 19.5 and a pH of less than 1. Silica, 20.0 g of the same grade used in Example 158, was added and the slurry was stirred at 88° C. for 4 hr. No yellow color remained. The silica was then filtered, washed in 2 L of water and filtered again two times. Then the silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 188: This experiment was designed to test the effect of Ti deposition from a high Ti concentration. Therefore, into only 15.0 mL of de-ionized water was dissolved 15.43 g of 15% $TiOSO_4$ solution, 24.02 g $NaNO_3$, 3 mL 35% $H_2O_2$ solution, and 39.1 mL of 2.80 N NaOH stock solution. This resulted in a total Na/Ti molar ratio of 27.0. As the NaOH was slowly added the deep orange-red color changed to a light yellow-orange color, and the pH rose to 4.7. Silica, 20.1 g of the same grade used in Example 158, was added and the slurry was stirred at 88° C. for 2 hr. After this treatment, the yellow color was indeed adsorbed onto the silica. The stirring was temporarily halted, and the yellow silica settled out leaving a clear colorless solution above. At this point the yellow silica was filtered, and the clear colorless liquid passing through the filter was tested for the presence of any Ti. It was acidified by the addition of 3 mL concentrated $H_2SO_4$, then 5 mL 35% $H_2O_2$ solution was added, but there was no change to an orange color, indicating the absence of Ti in the solution. The yellow filtered silica was then washed in 2 L of water and filtered again two times. Then the yellow silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 189: This experiment was designed to test the effect of high levels of Ti deposition. Therefore, into 63.24 g of de-ionized water was dissolved 67.0 g of 15% $TiOSO_4$ solution, and 3 mL 35% $H_2O_2$ solution to produce a deep red, nearly black, solution. Then 18.38 g of $Na_2CO_3$ was slowly added which produced a pH of 3.3. This resulted in a total Na/Ti molar ratio of 5.5. As the $Na_2CO_3$ was slowly added the deep red-black color changed to a lighter yellow-orange color, and the pH rose to 3.3. Silica, 20.1 g of the same grade used in Example 158, was added and the slurry was stirred at 85° C. for 1.5 hr. The yellow filtered silica was then washed in 2 L of water and filtered again two times. Then the yellow silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 190: This experiment was designed to test the effect of high levels of Ti deposition from the basic side. Therefore, into 144.2 g of de-ionized water was dissolved 31.37 g of $Na_2CO_3$ and 3 mL 35% $H_2O_2$ solution, followed by 44.61 g of 15% $TiOSO_4$ solution, to produce a yellow solution of pH 8.3. This resulted in a total Na/Ti molar ratio of 14.1. Silica, 20.1 g of the same grade used in Example 158, was added and the slurry was stirred at 80° C. for 3 hr. The yellow silica was filtered and washed in 2 L of water and filtered again two times. With each wash, however, the pH of the wash water was measured at 9.5. Knowing that sodium is difficult to remove at this pH, another wash was conducted in which 2 L of water was acidified with 5 mL of acetic acid to pH 3.5. The slurry was stirred for 30 min and then filtered again. Then the yellow silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 191: This experiment was designed to test the effect of Ti deposition at neutral pH from the basic side. Therefore, into 99.6 g of de-ionized water was dissolved 8.80 g of 15% $TiOSO_4$ solution, 4 mL of 35% $H_2O_2$ solution, and 68.4 mL of 1.00 N NaOH. This produced a clear yellow solution. Next 12.02 g of $NaNO_3$ was added, giving a pH of 6.2, and causing precipitation. However, precipitation does not necessarily stop Ti deposition on the silica, which suggests that the Ti precipitate may still be partially soluble and therefore mobile in the solution. This produced a total Na/Ti molar ratio of 25.4. Next the silica, 20.1 g of the same grade used in Example 158, was added and the slurry was stirred at 90° C. for 1.5 hr. The silica was filtered and washed in 2 L of water and filtered again two times. Then the silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 192: This experiment was designed to test the effect of limiting the $H_2O_2$ concentration to 1 $H_2O_2$/Ti on the deposition of Ti. Therefore, into 94.5 g of de-ionized water was dissolved 15.5 g of 15% $TiOSO_4$ solution, 0.5 mL of 35% $H_2O_2$ solution ($H_2O_2$/Ti of 1), and 37.0 mL of 2.80 N NaOH stock solution. This produced a clear yellow solution having a pH of 4.4. This produced a total Na/Ti molar ratio of 7.1. Next the silica, 20.4 g of the same grade used in Example 158, was added and the slurry was stirred at 90° C. for 5 hr. The silica was filtered and washed in 2 L of water and filtered again two times. Then the silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 193 This experiment was designed to determine if Ti could be deposited in the absence of sodium from the oxalate salt, that is, if oxalate/Ti is 2. Therefore, into 100.0 g of de-ionized water was dissolved 3.68 g of oxalic acid dihydrate and 3 mL of 35% $H_2O_2$ solution. Next 4.43 mL of titanium tetra-isopropoxide was added, which immediately hydrolyzed and precipitated hydrous titania. However, with continued stirring at 25° C. the precipitate dissolved in about 10 min to form a deep orange solution. Next 5.5 g of $NH_4Cl$ was added and over the next 20 min 55.1 mL of 1.37 N $NH_4OH$ was dripped into the mixture, resulting in the pH being measured at 8.1. Lastly the silica, 20.0 g of the same grade used in Example 158, was added and the slurry was stirred at 90° C. for 1.5 hr. The yellow-orange color was adsorbed onto the silica, but with continued heating the color changed to white or colorless. The final pH was measured as 7.0. The silica was filtered and washed in 2 L of water and filtered again two times. Then the silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 194: This experiment was designed to determine if Ti could be deposited in the absence of sodium from the oxalate salt, that is, if oxalate/Ti is 1. Therefore, into 100.0 g of de-ionized water was dissolved 1.84 g of oxalic acid dihydrate and 3 mL of 35% $H_2O_2$ solution. Next 4.43 mL of titanium tetra-isopropoxide was added, which immediately hydrolyzed and precipitated hydrous titania. However, with continued stirring at 25° C. the precipitate dissolved in about 10 min to form a deep orange solution. Next 5.9 g of $NH_4Cl$ was added and over the next 20 min 36.96 mL of 1.37 N $NH_4OH$ was dripped into the mixture, resulting in the pH being measured at 8.1. Lastly the silica, 20.0 g of the same grade used in Example 158, was added and the slurry was stirred at 90° C. for 1.5 hr. The yellow-orange color was adsorbed onto the silica, but with continued heating the color changed to white or colorless. The final pH was measured as 7.0. The silica was filtered and washed in 2 L of water and filtered again two times. Then the silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

Example 195: This experiment was designed to explore the use of lithium ions in place of the usual sodium ions. Into 100 mL of de-ionized water was added 2.52 g of oxalic acid dihydrate, 3 mL of 35% $H_2O_2$, and 4.4 mL of titanium tetra-isopropoxide. After about 10 min the titanium went into solution to make deep orange solution of pH<1. Then 10.9 g of $LiNO_3$ was added. Next 9.49 g of ammonium carbonate was added to raise the pH to 8.7. As the pH increased the color also lightened to yellow. The slurry was heated to 92° C. where it was heated for 1.5 hr. The silica was filtered, then washed in 2 L of water and filtered again. Then the silica was impregnated with 20 mL of chromium acetate/methanol solution (0.01 g Cr/mL), dried in a vacuum oven at 100° C. for several hr, pushed through a 35-mesh screen, and then calcined in dry air at 650° C. for 3 hr.

TABLE 18

| Example | Description |
|---|---|
| 158 | $TiOSO_4$ + NaOH + $Na_2SO_4$, pH 3, 75° C., 15 hr |
| 159 | $TiOSO_4$ + NaOH + $Na_2SO_4$, pH 4, 25° C., 3 days |
| 160 | $TiOSO_4$ + $H_2O_2$ + NaOH + $Na_2SO_4$, pH 3.5, 85° C., 2 hr |
| 161 | $TiOSO_4$ + $H_2O_2$ + $NaHCO_3$ + AKG, pH 9.5, 90° C. |
| 162 | $TiOSO_4$ + $H_2O_2$ + NaHCO3 + $EtNH_2$, pH 4, 92° C., 3 hr |
| 163 | $TiOSO_4$ + $H_2O_2$ + NaOH + $Na_2SO_4$, pH 3.6, 83° C., 2 hr |
| 164 | $TiOSO_4$ + $H_2O_2$ + NaOH + $Na_2SO_4$, pH 7.7, 80° C., 4 hr |
| 165 | $TiOSO_4$ + $H_2O_2$ + $Na_2SO_4$, pH 1.9, 85° C., 1 hr |
| 166 | $TiOSO_4$ + $H_2O_2$ + $NH_4OH$ + $Na_2SO_4$, pH 3.5, 25° C., 3 days |
| 167 | Ti, $TiOSO_4$ + $H_2O_2$ + $NH_4OH$, pH 3.7, 98° C., 2 hr |
| 168 | $TiOSO_4$ + $H_2O_2$ + $Mg(OH)_2$, pH 4.1, 25° C., 15 hr |
| 169 | $TiOSO_4$ + $MgSO_4$ + $H_2O_2$ + NaOH + $Na_2SO_4$, pH 4.3, 92° C., 0.8 hr |
| 170 | $TiOSO_4$ + $Me(OH)_2$ + $MgSO_4$ + $H_2O_2$, pH 4.2, 80° C., 5 hr |
| 171 | $TiOSO_4$ + $H_2O_2$ + 2.8 NaOH + $Na_2SO_4$, 93° C., 2.5 hr |
| 172 | $TiOSO_4$ + $H_2O_2$ + NaOH + $Na_2SO_4$, 25° C., 4 hr |
| 173 | $TiOSO_4$ + $H_2O_2$ + NaOH + $Na_2SO_4$, 95° C., 2.5 hr |
| 174 | $TiOSO_4$ + $H_2O_2$ + NaOH + $Na_2SO_4$, pH 4.5, 93° C., 1.5 hr |
| 175 | $TiOSO_4$ + $H_2O_2$ + NaOH + $Na_2SO_4$, pH 4.5, 25° C., 15 hr |
| 176 | $TiOSO_4$ + $H_2O_2$ + NaOH + $Na_2SO_3$, pH 4.3, 90° C., 1 hr |
| 177 | $TiOSO_4$ + $H_2O_2$ + $Na_2SO_4$, 95° C., 3 hr, $(NH_4)_2SO_4$, pH 4.1, 95° C., 2 h |
| 178 | $TiOSO_4$ + $H_2O_2$ + $Na_2SO_4$, 95° C., 3 hr, $NaHSO_3$, pH 4.1, 85° C., 2 hr |
| 179 | $TiOSO_4$ + $H_2O_2$ + $Na_2SO_4$, 95° C., 3 hr, pH 4.1, $Na_2CO_3$, pH 10, 25° C. |
| 180 | $TiOSO_4$ + $H_2O_2$ + $Na_2SO_4$, 95° C., 3 hr, pH 4.1, $Na_2CO_3$, pH 10, 87° C. |
| 181 | $TiOSO_4$ + $H_2O_2$ + $NH_4OH$, 25° C., 15 hr, + $Na_2SO_4$, pH 3, 85° C., 4 hr |
| 182 | $TiOSO_4$ + $H_2O_2$ + NaOH, pH 4.1, 25° C., 15 hr, remove Na, 90° C., 1.5 hr |
| 183 | $TiOSO_4$ + $H_2O_2$ + $NaNO_3$ + $Na_2SO_4$ + NaOH, pH 4, 56° C., 15 hr |
| 184 | $TiOSO_4$ + $H_2O_2$ + $NaNO_3$, + $Na_2SO_4$ + NaOH, pH 3.8, 70° C., 5.5 hr |
| 185 | $TiOSO_4$ + $H_2O_2$ + $KNO_3$ + KOH, pH 3.5, 90° C., 1.5 hr |
| 186 | $TiOSO_4$ + $H_2O_2$ + $Na_2SO_4$ + NaOH, pH 3.6, 83° C., 2 hr |
| 187 | $TiOSO_4$ + $H_2O_2$ + $NaNO_3$, pH < 1, 88° C., 4 hr |
| 188 | $TiOSO_4$ + $H_2O_2$ + $NaNO_3$ + NaOH, pH 4.7, 88° C., 2 hr |
| 189 | $TiOSO_4$ + $H_2O_2$ + $Na_2CO_3$, pH 3.3, 85° C., 1.5 hr |
| 190 | $TiOSO_4$ + $H_2O_2$ + $Na_2CO_3$, pH 8.3, 80° C., 3 hr |
| 191 | $TiOSO_4$ + NaOH + $NaNO_3$, pH 6.2, 90° C., 1.5 hr |
| 192 | $TiOSO_4$ + 1 $H_2O_2$ + NaOH, pH 4.4, 90° C. 5 hr |

TABLE 18-continued

| | |
|---|---|
| 193 | Ti(OiPr)$_4$ + 2 Oxalate + H$_2$O$_2$ + NH$_4$Cl, pH 8.1, 90° C., 1.5 hr |
| 194 | Ti(OiPr)$_4$ + 1 Oxalate + H$_2$O$_2$ + NH$_4$Cl, pH 8.1, 90° C., 1.5 hr |
| 195 | Ti(OiPr)$_4$ + Oxalate + H$_2$O$_2$ + NH$_4$CO$_3$, pH 8.7, 92° C., 1.5 hr |

| Example | Catalyst g | Induction Time min | Total Time min | Productivity gPE/gCat | Activity gPE/g/h | HLMI g/10 min |
|---|---|---|---|---|---|---|
| 158 | 0.0994 | 15.0 | 72.5 | 2948 | 3076 | 4.0 |
| 159 | 0.1036 | 20.0 | 99.5 | 3089 | 2331 | 4.0 |
| 160 | 0.1758 | 5.0 | 35.0 | 1809 | 3618 | 38.6 |
| 161 | 0.0478 | 6.0 | 63.0 | 5063 | 5329 | 16.2 |
| 162 | 0.0561 | 7.0 | 66.0 | 3440 | 3499 | 8.3 |
| 163 | 0.0475 | 12.0 | 73.0 | 2926 | 2878 | 24.2 |
| 164 | 0.0684 | 12.0 | 73.0 | 2997 | 2948 | 26.9 |
| 165 | 0.0474 | 15.0 | 72.0 | 1920 | 2021 | 8.5 |
| 166 | 0.0557 | 4.0 | 83.0 | 2926 | 2223 | 13.6 |
| 167 | 0.0514 | 7.0 | 64.0 | 3307 | 3481 | 5.2 |
| 168 | 0.0884 | 10.0 | 70.0 | 2387 | 2387 | 2.4 |
| 169 | 0.0667 | 8.0 | 85.0 | 2264 | 1764 | 10.4 |
| 170 | 0.1033 | 8.8 | 62.1 | 2924 | 3289 | 5.8 |
| 171 | 0.117 | 17.0 | 100.0 | 598 | 432 | 62.5 |
| 172 | 0.1127 | 10.0 | 70.0 | 1624 | 1624 | 3.1 |
| 173 | 0.1161 | 6.0 | 64.0 | 2239 | 2317 | 31.4 |
| 174 | 0.063 | 13.0 | 85.0 | 2556 | 2130 | 39.7 |
| 175 | 0.0478 | 43.0 | 66.0 | 481 | 1255 | 21.0 |
| 176 | 0.0545 | 31.0 | 81.0 | 1028 | 1233 | 0.0 |
| 177 | 0.0818 | 10.0 | 53.9 | 2941 | 4023 | 26.5 |
| 178 | 0.1022 | 8.3 | 64.5 | 3006 | 3207 | 13.8 |
| 179 | 0.0849 | 9.3 | 53.7 | 3025 | 4080 | 12.4 |
| 180 | 0.0788 | 15.6 | 86.7 | 3055 | 2580 | 34.1 |
| 181 | 0.0769 | 13.5 | 69.2 | 3155 | 3396 | 12.9 |
| 182 | 0.0978 | 10.2 | 65.0 | 3061 | 3352 | 17.4 |
| 183 | 0.0702 | 11.1 | 60.2 | 2896 | 3541 | 32.4 |
| 184 | 0.0833 | 9.8 | 69.4 | 2938 | 2956 | 35.2 |
| 185 | 0.0963 | 11.8 | 77.0 | 3193 | 2940 | 22.1 |
| 186 | 0.0837 | 17.2 | 76.7 | 3102 | 3125 | 27.5 |
| 187 | 0.0801 | 11.0 | 68.7 | 2954 | 3072 | 4.2 |
| 188 | 0.0853 | 10.3 | 55.8 | 3107 | 4097 | 32.4 |
| 189 | 0.0709 | 13.7 | 75.6 | 3061 | 2964 | 21.2 |
| 190 | 0.0833 | 16.1 | 74.9 | 1100 | 1121 | 38.0 |
| 191 | 0.0779 | 16.9 | 78.1 | 3140 | 3077 | 30.3 |
| 192 | 0.1023 | 10.0 | 76.7 | 3319 | 2988 | 6.4 |
| 193 | 0.0642 | 9.2 | 64.6 | 3117 | 3374 | 21.9 |
| 194 | 0.0826 | 7.5 | 68.5 | 3099 | 3045 | 18.9 |
| 195 | 0.0569 | 14.2 | 66.0 | 3099 | 3045 | 44.7 |

| Example | Cr | Na | Ti | K |
|---|---|---|---|---|
| 173 | 1.16% | 0.49% | 0.58% | |
| 174 | 1.26% | 0.94% | 2.10% | |
| 180 | 1.19% | 0.12% | 0.76% | |
| 181 | 1.06% | 0.10% | 1.94% | |
| 182 | 1.20% | 0.47% | 2.11% | |
| 183 | 1.01% | 1.35% | 3.14% | |
| 183 | 0.64% | 0.50% | 2.94% | |
| 184 | 1.01% | 0.14% | 3.53% | |
| 184 | 0.88% | 1.11% | 4.42% | |
| 185 | 1.02% | 0.00% | 4.75% | 0.91% |
| 186 | 0.82% | 0.42% | 3.89% | |
| 187 | 0.98% | 0.01% | 2.69% | |
| 188 | 0.75% | 0.41% | 3.22% | |
| 190 | 1.01% | 1.88% | 9.58% | 0.01% |
| 191 | 1.30% | 1.01% | 2.50% | |
| 192 | 1.32% | 0.04% | 1.41% | |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A titanated silica support comprising silica, from 0.1 to 10 wt. % titanium, from 0.5 to 12 wt. % water, less than or equal to 2 wt. % carbon, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica.

Aspect 2. A titanated chromium/silica pre-catalyst comprising silica, from 0.1 to 5 wt. % chromium, from 0.1 to 10 wt. % titanium, from 0.5 to 12 wt. % water, less than or equal to 4 wt. % carbon, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica.

Aspect 3. The pre-catalyst defined in aspect 2, wherein at least 75 wt. %, at least 80 wt. %, at least 90 wt. %, or at least 95 wt. %, of the chromium is present in an oxidation state of three or less.

Aspect 4. The support or pre-catalyst defined in any one of the preceding aspects, wherein the support or the pre-catalyst contains any suitable amount of carbon or an amount in any range disclosed herein, e.g., less than or equal to 3 wt. %, less than or equal to 2 wt. %, less than or equal to 1 wt. %, less than or equal to 0.5 wt. %, less than or equal to 0.3 wt. %, or less than or equal to 0.1 wt. %, based on the total weight of the respective support or pre-catalyst.

Aspect 5. The support or pre-catalyst defined in any one of the preceding aspects, wherein the support or the pre-catalyst contains any suitable amount of water/moisture or an amount in any range disclosed herein, e.g., from 0.5 to 12 wt. %, from 1 to 11 wt. %, from 2.5 to 10 wt. %, from 3 to 9 wt. %, or from 5 to 8 wt. %, based on the total weight of the respective support or pre-catalyst.

Aspect 6. A titanated chromium/silica catalyst comprising silica, from 0.1 to 5 wt. % chromium, from 0.1 to 10 wt. % titanium, and an alkali metal and/or zinc at a molar ratio of alkali metal:titanium or zinc:titanium from 0.02:1 to 3:1 and/or at an amount in a range from 0.01 to 2 mmol of alkali metal or zinc per gram of the silica, wherein at least 60 wt. % of the chromium is present in an oxidation state of +6.

Aspect 7. A titanated chromium/silica catalyst comprising silica, from 0.1 to 5 wt. % chromium, and from 0.1 to 10 wt. % titanium, wherein at least 60 wt. % of the chromium is present in an oxidation state of +6, and the catalyst is characterized by a HLMI (g/10 min) of the polymer that is greater than the equation Y (HLMI)=$(-9.6153x^3+21.088x^2+25.835x+5.7983)$, wherein x is the number of titanium atoms per square nanometer of silica surface area for the titanated chromium/silica catalyst.

Aspect 8. The catalyst defined in aspect 7, wherein the catalyst further comprises an alkali metal and/or zinc at a molar ratio of alkali metal:titanium or zinc:titanium from 0.02:1 to 3:1, and/or an alkali metal and/or zinc at an amount in a range from 0.01 to 2 mmol of alkali metal or zinc per gram of the silica.

Aspect 9. The catalyst defined in any one of aspects 6-8, wherein at least 70 wt. %, at least 75 wt. %, at least 80 wt. %, at least 85 wt. %, at least 90 wt. %, or at least 95 wt. %, of the chromium is present in an oxidation state of +6.

Aspect 10. The catalyst defined in any one of aspects 6-9, wherein the catalyst is characterized by a HLMI (g/10 min) of the polymer that is greater than the equation Y (HLMI) =$(-9.6153x^3+21.088x^2+25.835x+5.7983)$, wherein x is the number of titanium atoms per square nanometer of silica surface area for the titanated chromium/silica catalyst; alternatively, Y=$1.1*(-9.6153x^3+21.088x^2+25.835x+5.7983)$; alternatively, Y=$1.15*(-9.6153x^3+21.088x^2+25.835x+5.7983)$; alternatively, Y=$1.2*(-9.6153x^3+21.088x^2+25.835x+5.7983)$; or alternatively, Y=$1.3*(-9.6153x^3+21.088x^2+25.835x+5.7983)$.

Aspect 11. The catalyst defined in any one of aspects 6-10, wherein the catalyst contains any suitable amount of water/moisture or an amount in any range disclosed herein, less than or equal to 3 wt. %, less than or equal to 2 wt. %, less than or equal to 1.5 wt. %, less than or equal to 1 wt. %, or less than or equal to 0.5 wt. %, based on the total weight of the catalyst.

Aspect 12. The catalyst or pre-catalyst defined in any one of aspects 2-11, wherein the catalyst contains any suitable amount of the chromium or an amount in any range disclosed herein, e.g., from 0.3 to 3 wt. %, from 0.4 to 2 wt. %, from 0.5 to 1.5 wt. %, or from 0.7 to 1.5 wt. %, based on the total weight of the respective catalyst.

Aspect 13. The support, pre-catalyst, or catalyst defined in any one of the preceding aspects, wherein the support, the pre-catalyst, or the catalyst contains any suitable amount of the titanium or an amount in any range disclosed herein, e.g., from 0.5 to 7 wt. %, from 0.5 to 3 wt. %, from 0.8 to 2 wt. %, from 1 to 6 wt. %, or from 1.5 to 4 wt. %, based on the total weight of the respective support, pre-catalyst, or catalyst.

Aspect 14. The support, pre-catalyst, or catalyst defined in any one of the preceding aspects, wherein the support, pre-catalyst, or the catalyst contains any suitable amount of nitrogen or an amount in any range disclosed herein, e.g., from 0.01 to 1.5 wt. %, from 0.1 to 1.5 wt. %, from 0.3 to 1 wt. %, from 0.4 to 1.2 wt. %, from 0.4 to 1 wt. %, or from 0.5 to 0.7 wt. %, based on the total weight of the respective support, pre-catalyst, or catalyst.

Aspect 15. The support, pre-catalyst, or catalyst defined in any one of the preceding aspects, wherein the support, pre-catalyst, or the catalyst contains any suitable amount of the alkali metal or zinc, or an amount in any range disclosed herein, e.g., a minimum molar ratio of alkali metal:titanium or zinc:titanium of 0.02:1, 0.05:1, 0.08:1, 0.1:1, 0.12:1, 0.15:1, or 0.2:1, and a maximum molar ratio 3:1, 2.5:1, 2.2:1, 2:1, or 1.8:1, and the molar ratio can range from any minimum molar ratio to any maximum ratio disclosed herein.

Aspect 16. The support, pre-catalyst, or catalyst defined in any one of the preceding aspects, wherein the support, pre-catalyst, or the catalyst contains any suitable amount of the alkali metal or zinc, or an amount in any range disclosed herein, e.g., a minimum amount of the alkali metal or zinc per gram of silica of 0.01, 0.02, 0.04, 0.08, 0.1, 0.11, 0.13, or 0.15 mmol/g, and a maximum amount of 2, 1.5, 1.2, 1, 0.9, or 0.8 mmol/g, and the amount in mmol/g can range from any minimum amount to any maximum amount disclosed herein.

Aspect 17. The support, pre-catalyst, or catalyst defined in any one of the preceding aspects, wherein the support, pre-catalyst, or the catalyst comprises the alkali metal.

Aspect 18. The support, pre-catalyst, or catalyst defined in any one of the preceding aspects, wherein the support, pre-catalyst, or the catalyst comprises zinc.

Aspect 19. The support, pre-catalyst, or catalyst defined in any one of the preceding aspects, wherein the alkali metal comprises lithium, sodium, potassium, or a combination thereof; alternatively, lithium; alternatively, sodium; or alternatively, potassium.

Aspect 20. The support, pre-catalyst, or catalyst defined in any one of the preceding aspects, wherein the titanium is adsorbed onto the silica.

Aspect 21. The support, pre-catalyst, or catalyst defined in any one of the preceding aspects, wherein at least a portion of the zinc or the alkali metal is bound (chemically) to the titanium.

Aspect 22. The support, pre-catalyst, or catalyst defined in any one of the preceding aspects, wherein at least a portion of the zinc and the titanium is present as zinc titanate and/or at least a portion of the alkali metal and the titanium is present as an alkali metal titanate, e.g., sodium titanate.

Aspect 23. The support, pre-catalyst, or catalyst defined in any one of the preceding aspects, wherein the support, the pre-catalyst, or the catalyst contains any suitable amount of the silica or an amount in any range disclosed herein, e.g., from 70 to 99.5 wt. %, from 80 to 98 wt. %, from 80 to 95 wt. %, from 85 to 98 wt. %, from 85 to 95 wt. %, from 90 to 99.5 wt. %, or from 90 to 98 wt. %, based on the total weight of the respective support, pre-catalyst, or catalyst.

Aspect 24. The support, pre-catalyst, or catalyst defined in any one of the preceding aspects, wherein the support, the pre-catalyst, or the catalyst has a pore volume (total) in any suitable range, or any range disclosed herein, e.g., from 0.5 to 3 mL/g, from 0.8 to 2.5 mL/g, from 1 to 2 mL/g, or from 1.3 to 1.8 mL/g.

Aspect 25. The support, pre-catalyst, or catalyst defined in any one of the preceding aspects, wherein the support, the pre-catalyst, or the catalyst has a BET surface area in any suitable range, or any range disclosed herein, e.g., from 100 to 700 $m^2/g$, from 150 to 650 $m^2/g$, from 200 to 600 $m^2/g$, or from 250 to 550 $m^2/g$.

Aspect 26. The support, pre-catalyst, or catalyst defined in any one of the preceding aspects, wherein the support or the catalyst has an average (d50) particle size in any suitable range, or any range disclosed herein, e.g., from 15 to 350 μm, from 25 to 300 μm, from 50 to 200 μm, or from 75 to 150 μm.

Aspect 27. An olefin polymerization process, the process comprising contacting the titanated chromium/silica catalyst defined in any one of aspects 6-26 and an optional co-catalyst with an olefin monomer and an optional olefin comonomer in a polymerization reactor system under polymerization conditions to produce an olefin polymer.

Aspect 28. The olefin polymerization process defined in aspect 27, wherein a co-catalyst is used, and the co-catalyst comprises any suitable co-catalyst or any co-catalyst disclosed herein, e.g., an aluminoxane co-catalyst, an organoaluminum co-catalyst, or an organoboron co-catalyst, or any combination thereof.

Aspect 29. The olefin polymerization process defined in aspect 27 or 28, wherein the olefin monomer comprises any olefin monomer disclosed herein, e.g., any $C_2$-$C_{20}$ olefin.

Aspect 30. The olefin polymerization process defined in any one of aspects 27-29, wherein the olefin monomer and the optional olefin comonomer independently comprise a $C_2$-$C_{20}$ alpha-olefin.

Aspect 31. The olefin polymerization process defined in any one of aspects 27-30, wherein the olefin monomer comprises ethylene.

Aspect 32. The olefin polymerization process defined in any one of aspects 27-31, wherein the titanated chromium/silica catalyst is contacted with ethylene and an olefin comonomer comprising a $C_3$-$C_{10}$ alpha-olefin.

Aspect 33. The olefin polymerization process defined in any one of aspects 27-32, wherein the titanated chromium/silica catalyst is contacted with ethylene and an olefin comonomer comprising 1-butene, 1-hexene, 1-octene, or a mixture thereof.

Aspect 34. The olefin polymerization process defined in any one of aspects 27-33, wherein the polymerization reactor system comprises a batch reactor, a slurry reactor, a gas-phase reactor, a solution reactor, a high pressure reactor, a tubular reactor, an autoclave reactor, or a combination thereof.

Aspect 35. The olefin polymerization process defined in any one of aspects 27-33, wherein the polymerization reactor system comprises a slurry reactor, a gas-phase reactor, a solution reactor, or a combination thereof.

Aspect 36. The olefin polymerization process defined in any one of aspects 27-35, wherein the polymerization reactor system comprises a loop slurry reactor.

Aspect 37. The olefin polymerization process defined in any one of aspects 27-36, wherein the polymerization reactor system comprises a single reactor.

Aspect 38. The olefin polymerization process defined in any one of aspects 27-36, wherein the polymerization reactor system comprises 2 reactors.

Aspect 39. The olefin polymerization process defined in any one of aspects 27-36, wherein the polymerization reactor system comprises more than 2 reactors.

Aspect 40. The olefin polymerization process defined in any one of aspects 27-39, wherein the olefin polymer comprises any olefin polymer disclosed herein.

Aspect 41. The olefin polymerization process defined in any one of aspects 27-40, wherein the olefin polymer comprises an ethylene homopolymer, an ethylene/1-butene copolymer, an ethylene/1-hexene copolymer, and/or an ethylene/1-octene copolymer.

Aspect 42. The olefin polymerization process defined in any one of aspects 27-41, wherein the polymerization conditions comprise a polymerization reaction temperature in a range from 60° C. to 120° C. and a reaction pressure in a range from 200 to 1000 psig (from 1.4 to 6.9 MPa).

Aspect 43. The olefin polymerization process defined in any one of aspects 27-42, wherein the polymerization conditions are substantially constant, e.g., for a particular polymer grade.

Aspect 44. The olefin polymerization process defined in any one of aspects 27-43, wherein no hydrogen is added to the polymerization reactor system.

Aspect 45. The olefin polymerization process defined in any one of aspects 27-43, wherein hydrogen is added to the polymerization reactor system.

Aspect 46. The olefin polymerization process defined in any one of aspects 27-45, wherein the olefin polymer has a density in any range disclosed herein, e.g., from 0.92 to 0.965, from 0.93 to 0.96, from 0.935 to 0.955, or from 0.94 to 0.95 $g/cm^3$.

Aspect 47. The olefin polymerization process defined in any one of aspects 27-46, wherein the olefin polymer has a MI in any range disclosed herein, e.g., from 0 to 100, from 0.1 to 10, from 0.2 to 5, or from 0.25 to 2 g/10 min.

Aspect 48. The olefin polymerization process defined in any one of aspects 27-47, wherein the olefin polymer has a HLMI in any range disclosed herein, e.g., from 1 to 1000, from 5 to 500, from 6 to 40, from 8 to 60, from 10 to 100, or from 12 to 50 g/10 min.

Aspect 49. The olefin polymerization process defined in any one of aspects 27-48, wherein the olefin polymer has a ratio of Mw/Mn in any range disclosed herein, e.g., from 5 to 30, from 7 to 25, from 9 to 20, from 10 to 25, or from 10 to 15.

Aspect 50. The olefin polymerization process defined in any one of aspects 27-49, wherein the olefin polymer has a Mw in any range disclosed herein, e.g., from 10 to 500, from 30 to 300, from 50 to 400, from 50 to 250, from 80 to 200, or from 100 to 250 kg/mol.

Aspect 51. The olefin polymerization process defined in any one of aspects 27-50, wherein the olefin polymer has a Mn in any range disclosed herein, from 1 to 50, from 3 to 30, from 4 to 40, from 5 to 25, or from 8 to 20 kg/mol.

Aspect 52. The olefin polymerization process defined in any one of aspects 27-51, wherein the olefin polymer has a CY-a parameter in any range disclosed herein, e.g., from 0.05 to 0.5, from 0.08 to 0.4, from 0.1 to 0.3, from 0.1 to 0.25, or from 0.15 to 0.25.

Aspect 53. The olefin polymer produced by the olefin polymerization process defined in any one of aspects 27-52.

Aspect 54. An article of manufacture comprising the polymer defined in aspect 53.

Aspect 55. The article defined in aspect 54, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

Aspect 56. A process for preparing a titanated silica support, the process comprising: (i) contacting water, a peroxide compound, and a titanium precursor to form a first mixture, (ii) contacting a silica with the first mixture under conditions sufficient for titanium to adsorb onto the silica and form a second mixture, (iii) isolating a solid fraction from the second mixture, and (iv) drying the solid fraction to form the titanated silica support.

Aspect 57. A process for preparing a titanated silica support, the process comprising: (a) contacting water, hydrogen peroxide, an alkali metal precursor and/or a zinc precursor, a nitrogen-containing compound, and a titanium precursor to form a first mixture, (b) contacting a silica with the first mixture under conditions sufficient for titanium to adsorb onto the silica and form a second mixture, (c) subjecting the second mixture to a reaction temperature in a range from 40 to 100° C., (d) isolating a solid fraction from the second mixture and washing the solid fraction, and (e) drying the solid fraction to form the titanated silica support.

Aspect 58. A process for preparing a titanated silica support, the process comprising: (A) contacting water, hydrogen peroxide, an alkali metal precursor and/or a zinc precursor, and a titanium precursor to form a first mixture, (B) contacting a silica with the first mixture under conditions sufficient for titanium to adsorb onto the silica and form a second mixture, (C) subjecting the second mixture to a reaction temperature in a range from 40 to 100° C., (D) isolating a solid fraction from the second mixture and washing the solid fraction, and (E) drying the solid fraction to form the titanated silica support.

Aspect 59. The process defined in any one of aspects 56-58, wherein the first mixture is formed by contacting the materials in any order or sequence.

Aspect 60. The process defined in any one of aspects 56-59, wherein a molar ratio of the peroxide compound or hydrogen peroxide to titanium is in any suitable range or any range disclosed herein, e.g., from 0.5:1 to 100:1, from 2:1 to 50:1, from 3:1 to 20:1, or from 5:1 to 11:1.

Aspect 61. The process defined in any one of aspects 56-60, wherein a molar ratio of the alkali metal or zinc to titanium is in any suitable range or any range disclosed herein, e.g., from 0.1:1 to 300:1, such as from 0.2:1 to 100:1, from 0.5:1 to 20:1, from 0.7:1 to 10:1, from 1:1 to 5:1, or from 1:1 to 3:1.

Aspect 62. The process defined in any one of aspects 56-61, wherein a weight ratio of titanium to water (Ti:H$_2$O) is in any suitable range or any range disclosed herein, e.g., from 0.0001:1 to 0.02:1, from 0.001:1 to 0.02:1, from 0.005:1 to 0.02:1, or from 0.03:1 to 0.07:1.

Aspect 63. The process defined in any one of aspects 56-62, wherein the titanium precursor comprises any suitable titanium compound or any titanium compound disclosed herein, e.g., a Ti (III) compound, a Ti (IV) compound, or any combination thereof.

Aspect 64. The process defined in any one of aspects 56-62, wherein the titanium precursor comprises a titanium carboxylate (e.g., titanium oxalate, titanium glycolate, titanium lactate, titanium citrate, titanium malate), a titanium halide, a titanium oxide, a titanium hydroxide, a titanium alkoxide (e.g., titanium isopropoxide, titanium n-propoxide), a titanium sulfate, a titanium nitrate, or any combination thereof.

Aspect 65. The process defined in any one of aspects 56-62, wherein the titanium precursor comprises TiOSO$_4$, Ti(OH)$_4$, Ti metal, Ti(OR)$_4$, TiO(OH)$_2$, or any combination thereof.

Aspect 66. The process defined in any one of aspects 56-65, further comprising a step of adjusting a pH of the first mixture to within any suitable range or any range disclosed herein, e.g., from 3 to 12, from 3 to 10, from 4 to 12, from 4 to 10, or from 6 to 10, prior to contacting the silica with the first mixture.

Aspect 67. The process defined in any one of aspects 57-66, wherein a weight ratio of the nitrogen-containing compound to titanium is in any suitable range or any range disclosed herein, e.g., from 5:1 to 300:1, from 10:1 to 200:1, from 25:1 to 150:1, or from 50:1 to 100:1.

Aspect 68. The process defined in any one of aspects 56-67, wherein the silica contains any suitable amount of water/moisture or an amount in any range disclosed herein, less than or equal to 25 wt. %, less than or equal to 20 wt. %, less than or equal to 15 wt. %, or less than or equal to 10 wt. %, based on the total weight of the silica.

Aspect 69. The process defined in any one of aspects 56-68, wherein the silica is characterized by the pore volume, surface area, and average particle size defined in any one of aspects 24-26.

Aspect 70. The process defined in any one of aspects 56-67, wherein the silica contains any suitable amount of water or an amount in any range disclosed herein, at least 50 wt. %, at least 60 wt. %, at least 70 wt. %, or at least 80 wt. %, such as a silica hydrogel.

Aspect 71. The process defined in any one of aspects 56-70, wherein the silica is contacted with the first mixture at a weight ratio of the silica to water (silica:H$_2$O) in any suitable range or any range disclosed herein, e.g., from 0.001:1 to 1:1, from 0.01:1 to 0.5:1, from 0.05:1 to 0.4:1, or from 0.1:1 to 0.3:1.

Aspect 72. The process defined in any one of aspects 56-71, wherein the second mixture is subjected to a reaction temperature in any suitable range or any range disclosed herein, e.g., from 50° C. to 100° C., from 60° C. to 100° C., from 70° C. to 100° C., or from 80° C. to 100° C.

Aspect 73. The process defined in any one of aspects 56-72, wherein the second mixture is subjected to a reaction temperature for any suitable period of time or a period of time in any range disclosed herein, e.g., from 10 min to 4 days, from 20 min to 2 days, from 30 min to 24 hr, or from 40 min to 2 hr.

Aspect 74. The process defined in any one of aspects 56-73, wherein isolating the solid fraction comprises any suitable separations technique or any technique disclosed herein, e.g., filtering, settling, decanting, pressing, centrifuging, cycloning, hydrocycloning, or any combination thereof.

Aspect 75. The process defined in any one of aspects 56-74, wherein washing the solid fraction comprising any suitable wash solution or any wash solution disclosed herein, e.g., water, an alcohol (e.g., ethanol), or a mixture thereof.

Aspect 76. The process defined in any one of aspects 56-75, wherein drying is conducted at any suitable temperature or a temperature in any range disclosed herein, e.g., from 25° C. to 200° C., from 50° C. to 150° C., from 70° C. to 120° C., or from 90° C. to 110° C.

Aspect 77. The process defined in any one of aspects 56-76, wherein drying is conducted for any suitable period of time or a period of time in any range disclosed herein, e.g., from 1 sec to 1 day, from 1 hr to 12 hr, from 2 hr to 8 hr, or from 0.1 to 5 sec.

Aspect 78. The process defined in any one of aspects 56-77, wherein drying comprises spray drying, tray drying, flash drying, freeze drying, oven drying, microwave drying; alternatively, spray drying; or alternatively, flash drying.

Aspect 79. The titanated silica support prepared by the process defined in any one of aspects 56-78.

Aspect 80. The titanated silica support prepared by the process defined in any one of aspects 56-78, wherein the titanated silica support is defined by any one of aspects 1-26.

Aspect 81. A process for preparing a titanated chromium/silica pre-catalyst, the process comprising: performing the process for preparing a titanated silica support defined in any one of aspects 56-78, and contacting a chromium precursor with the first mixture or the second mixture in any step prior to the step of isolating the solid fraction from the second mixture.

Aspect 82. A process for preparing a titanated chromium/silica pre-catalyst, the process comprising: performing the process for preparing a titanated silica support defined in any one of aspects 56-78, and contacting a chromium precursor with the solid fraction after isolating the solid fraction from the second mixture (before or after drying the solid fraction).

Aspect 83. The process defined in aspect 81 or 82, wherein the chromium precursor comprises any suitable chromium compound or any chromium compound disclosed herein, e.g., a chromium (II) compound, a chromium (III) compound, or any combination thereof.

Aspect 84. The process defined in any one of aspects 81-83, wherein the chromium precursor comprises chromium trioxide, chromium acetate, chromium hydroxy acetate, chromium nitrate, or any combination thereof.

Aspect 85. The process defined in any one of aspects 81-84, wherein the chromium precursor is soluble in water.

Aspect 86. A process for preparing a titanated chromium/silica pre-catalyst, the process comprising: performing the process for preparing a titanated silica support defined in any one of aspects 56-78, except instead of contacting the silica with the first mixture, contacting a chromium/silica pre-catalyst with the first mixture.

Aspect 87. The titanated chromium/silica pre-catalyst produced by the process defined in any one of aspects 81-86.

Aspect 88. The titanated chromium/silica pre-catalyst produced by the process defined in any one of aspects 81-86, wherein the titanated chromium/silica pre-catalyst is defined by any one of aspects 2-26.

Aspect 89. A process for preparing a titanated chromium/silica catalyst, the process comprising: performing the process for preparing a titanated chromium/silica pre-catalyst defined in any one of aspects 81-86, and activating the titanated chromium/silica pre-catalyst to form the (activated) titanated chromium/silica catalyst.

Aspect 90. The process defined in aspect 89, wherein activating comprises any suitable temperature and time conditions or any temperature and time conditions disclosed herein, e.g., from 400° C. to 900° C., from 500° C. to 850° C., from 600° C. to 800° C., or from 600° C. to 700° C., for a time period of from 1 min to 24 hr, from 1 hr to 12 hr, from 2 hr to 8 hr, or from 2 hr to 6 hr.

Aspect 91. The titanated chromium/silica catalyst produced by the process defined in aspect 89 or 90.

Aspect 92. The titanated chromium/silica catalyst produced by the process defined in aspect 89 or 90, wherein the titanated chromium/silica catalyst is defined by any one of aspects 6-26.

We claim:

1. A process for preparing a titanated silica support, the process comprising:
   (i) contacting water, a peroxide compound, and a titanium precursor to form a first mixture;
   (ii) contacting a silica with the first mixture under conditions sufficient for titanium to adsorb onto the silica and form a second mixture;
   (iii) isolating a solid fraction from the second mixture and washing the solid fraction; wherein:
   isolating the solid fraction comprises filtering and/or centrifuging; and
   washing the solid fraction comprises contacting the solid fraction with a wash solution containing water; and
   (iv) drying the solid fraction to form the titanated silica support.

2. The process of claim 1, wherein:
   step (i) comprises contacting water, hydrogen peroxide, a sodium precursor, a nitrogen-containing compound, and the titanium precursor to form the first mixture; and
   the second mixture is subjected to a reaction temperature in a range from 40 to 100° C. before isolating the solid fraction.

3. The process of claim 2, wherein:
   the silica is a preformed silica.

4. The process of claim 1, wherein:
   step (i) comprises contacting water, hydrogen peroxide, a sodium precursor, and the titanium precursor to form the first mixture; and
   the second mixture is subjected to a reaction temperature in a range from 40 to 100° C. before isolating the solid fraction.

5. The process of claim 4, wherein:
   the silica is a preformed silica.

6. The process of claim 1, wherein the process further comprises a step of adjusting a pH of the first mixture to within a range from 3 to 12, prior to contacting the silica with the first mixture.

7. A process for preparing a titanated chromium/silica pre-catalyst, the process comprising:
   performing the process for preparing a titanated silica support of claim 1; and
   contacting a chromium precursor with the first mixture or the second mixture in any step prior to the step of isolating the solid fraction from the second mixture.

8. A process for preparing a titanated chromium/silica catalyst, the process comprising:
   performing the process for preparing a titanated chromium/silica pre-catalyst of claim 7; and
   activating the titanated chromium/silica pre-catalyst to form the titanated chromium/silica catalyst.

9. A process for preparing a titanated chromium/silica pre-catalyst, the process comprising:
   performing the process for preparing a titanated silica support of claim 1; and
   contacting a chromium precursor with the solid fraction after isolating the solid fraction from the second mixture.

10. A process for preparing a titanated chromium/silica catalyst, the process comprising:
   performing the process for preparing the titanated chromium/silica pre-catalyst of claim 9; and activating the titanated chromium/silica pre-catalyst to form the titanated chromium/silica catalyst.

11. A process for preparing a titanated chromium/silica pre-catalyst, the process comprising:

performing the process for preparing a titanated silica support of claim 1, except instead of contacting the silica with the first mixture, contacting a chromium/silica pre-catalyst with the first mixture.

12. The process of claim 1, wherein a weight ratio of titanium of the titanium precursor to the water (Ti:$H_2O$) is in a range from 0.0001:1 to 0.02:1; and a weight ratio of the silica to the water (silica:$H_2O$) is in a range from 0.001:1 to 1:1.

13. The process of claim 12, wherein the silica is a preformed silica.

14. The process of claim 12, wherein the silica is a silica hydrogel.

15. The process of claim 12, wherein a molar ratio of the peroxide compound to the titanium precursor is in a range from 0.5:1 to 100:1.

16. The process of claim 1, wherein drying comprises spray drying or flash drying.

17. The process of claim 1, wherein a sodium precursor is added in step (ii) after the silica is contacted with the first mixture.

18. The process of claim 17, wherein a molar ratio of the sodium precursor to the titanium precursor is in a range from 0.1:1 to 300:1.

19. The process of claim 18, wherein the silica is a preformed silica.

20. The process of claim 18, wherein the silica is a silica hydrogel.

* * * * *